United States Patent
Nakano

[11] Patent Number: 6,021,511
[45] Date of Patent: *Feb. 1, 2000

[54] PROCESSOR

[75] Inventor: Hiraku Nakano, Kyoto, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/807,745

[22] Filed: Feb. 27, 1997

[30] Foreign Application Priority Data

Feb. 29, 1996 [JP] Japan .................................. 8-042315

[51] Int. Cl.$^7$ .................................. G06F 9/38; G06F 9/28
[52] U.S. Cl. .................................. 714/48; 714/49; 714/10; 714/11; 714/3
[58] Field of Search .................................. 395/185.01, 185.02, 395/182.08, 182.09, 182.01; 714/48, 49, 10, 11, 3

[56] References Cited

U.S. PATENT DOCUMENTS

| | | |
|---|---|---|
| 4,200,226 | 4/1980 | Piras . |
| 4,816,993 | 3/1989 | Takahashi et al. . |
| 5,517,628 | 5/1996 | Morrison et al. . |
| 5,583,987 | 12/1996 | Kobayashi et al. ................ 395/182.11 |
| 5,630,053 | 5/1997 | Morikawa ........................... 395/184.01 |

FOREIGN PATENT DOCUMENTS

| | | |
|---|---|---|
| 61-103269 | 5/1986 | Japan . |
| 3-6740 | 1/1991 | Japan . |
| 5-216852 | 8/1993 | Japan . |

*Primary Examiner*—Ly Hua
*Attorney, Agent, or Firm*—McDermott, Will & Emery

[57] ABSTRACT

This invention discloses a processor with a plurality of execution units integrated into a chip. The execution unit has an initial failure signal output device which provides an initial failure signal when there is an initial failure in its own execution unit. Further, the execution unit has an operating failure detection device which detects and provides an operating failure signal when there is a passage-of-time failure in its own execution unit. A count device for counting the number of normally operable execution units is provided which receives initial failure signals or passage-of-time failures, as fault information, from faulty execution units if any and which finds, based on the fault information, the number of normally operable execution units. An operable execution unit selection allocation device is provided which allocates, according to the fault information, instructions, only to normally operable execution units. Accordingly, failure detection of faulty execution units can be achieved in an early stage, no chips are wasted, and the processor can operate normally without troubles.

42 Claims, 15 Drawing Sheets

PROCESSOR

FIELD OF THE INVENTION

The present invention relates to processors and more particularly to improvements in processors with a plurality of execution units for parallel (simultaneous) processing of a multiplicity of instructions such as arithmetic operations.

BACKGROUND OF THE INVENTION

A commonly-used processor is formed of a single LSI of a chip and a package or is formed of a plurality of LSIs. When a failure occurs in an LSI of the processor, such a faulty LSI is discarded for replacement with a good one while the remaining operable LSIs are used intact.

Recent semiconductor technology has dramatically improved the scale of processor implementable by a single chip. For example, the world's first microprocessor, introduced in 1971, is a 4-bit processor. At ISSCC held in 1992, a microprocessor, in which two 32-bit CPUs and cache are concentrated in a single chip by 0.3 $\mu$m BiCMOS technology, was reported. Also, in the field of parallel computing, a processor was reported in 1994 at ISSCC, in which 0.55 $\mu$m BiCMOS technology is used to integrate 64 8-bit element processors in a single chip.

According to the classification of processors by Flynn, they are classified into four types depending on the respective numbers of instructions and data items to be dealt with, namely (1) SISD (Single Instruction Single Data stream), (2), SIMD (Single Instruction Multi Data stream), (3) MISD and (4) MIMD. The former microprocessor is classified as an MIMD processor and the latter processor is classified as an SIMD processor. The very long instruction word (VLIW) instruction processor, which uses a VLIW instruction composed of a great number of instructions, may be classified as follows. A VLIW instruction processor is classified as an SIMD processor when a VLIW instruction is taken as a single instruction, while on the other hand it is classified as an MIMD processor when it is considered such that the operations of individual execution units are instructed by individual instructions contained in a VLIW instruction.

In any case of employing any one of MIMD, SIMD and VLIW as a processor, it is estimated that a great number of processors (execution units) are mounted on a single chip, for the semiconductor technology generation changes every three years and it is expected that such a change in the semiconductor technology generation will continue until the year of 2010.

However, integration of a great number of execution units in a single chip produces some problems. One of the problems is that the cost of chips increases if a defect in a single execution unit results in discarding an entire chip containing also normally operable execution units.

Major elements of a processor are an instruction control unit, an execution unit, a register file, an instruction cache, a data cache, a memory management unit, a bus control unit and a main memory. It is expected that main memory is incorporated in the same chip in the near future. For the case of storage elements requiring larger areas in the chip such as register file, instruction cache, data cache and main memory, redundant parts which function in case they fail to operate normally are provided, as in DRAMs. In other words, a faulty part is replaced with a corresponding redundant part, so that the above-described problem can be solved. On the other hand, elements, such as instruction control units, memory management units and bus control units, require less chip area, so that the rate of failure occurrence is low. Difficulties occur when greater area requiring elements other than storage elements, i.e., execution units and element processors in the case of parallel computing, fail to normally operate.

Various measurements have been proposed to cope with such an execution unit failure problem. Japanese Patent Application Laid Open Gazette No. 5-216852 discloses a technique. A data processor with first and second instruciton execution control units is shown which has the ability to perform instructions in parallel. When "collision" of instructions occurs, that is, when they cannot be executed at the same time, (a) these instructions are executed in one of the two instruction execution control units (for example, the first instruction execution control unit), (b) the second instruction execution control unit also executes the instructions that the first instruction execution control unit is executing and (c) results of the first and second units are compared in a failure detection circuit, to detect an instruction execution control unit failure. When such a failure is detected in one of the instruction execution control units, only the other instruction execution control unit which is a normally operable unit is used to execute the instructions on series.

Japanese Patent Application Laid Open Gazette No. 5-216852, however, produces an inconvenient circumstance that the detecting of a failure can be made only when any one of the instruction execution control units is not in use or operation, in other words failures cannot be detected when a plurality of instructions are being performed in parallel in both the instruction execution control units. This means that, even when any one of the instruction execution control units fails at the time when parallel instruction processing is being executed, it is necessary to wait for one of the instruction execution control units to enter the idle state, to start detecting the failure. Accordingly, many instructions will have been executed by the time that the failure is detected. To sum up, the above-described prior art technology is unable to find failures in early stages and lacks the ability to secure normal operations for processors. Although, in general, the presence or absence of an initial failure in each instruction execution control unit may be detected by failure detection testing made immediately after their fabrication (hereinafter referred to post-fabrication failure detection testing), the prior art technique shown in the foregoing gazette is not provided with a means capable of reporting, when an initial failure is detected in post-fabrication failure detection testing, such an initial failure, as a result of which, when a data processor starts operating without being discarded, it is not until a failure detection circuit discovers the failure during the data processor's operation that a faulty instruction execution unit is screened out. Accordingly, in the prior art technique, failures cannot be detected in early stages and processor's normal operations cannot be secured, either.

SUMMARY OF THE INVENTION

Bearing in mind the above-noted problems with the prior art techniques, the present invention was made. Accordingly, it is an object of this invention to provide an improved processor with a plurality of execution units. More specifically, the present processor has the ability to detect a failure occurring in any one of the execution units in an early stage in order that the processor operates normally.

Each execution unit of the present processor is provided with its own failure detection circuit so that a failure can be self-detected independently of the other execution units.

Additionally, in accordance with the present invention, an arrangement of generating an initial failure signal in the case of the presence of an initial failure in any one of the execution units, is made, whereby a faulty execution unit is screened out.

The present invention provides an improved processor. This processor comprises a plurality of execution units for performing respective instructions, each of the execution units being provided with a failure signal output means for generating a failure signal when a failure occurs in its own execution unit.

The present invention provides another improved processor. This processor comprises a plurality of execution units for performing respective instructions, each of the execution units being provided with an initial failure signal output means for generating an initial failure signal when an initial failure is detected by post-fabrication testing in its own execution unit.

In accordance with the present invention, either a failure signal output means or an initial failure signal output means is provided to each execution unit (element processor). As a result of such arrangement, each signal output means provides a failure signal the moment that a failure occurs in a corresponding execution unit (element processor). At this point in time, only the remaining operable execution units other than the faulty execution unit are used for instruction execution thereby securing normal operations. Accordingly, a faulty execution unit can ben detected in an early stage, so that instead of discarding a processor containing a faulty execution unit (element processor), the processor can be used without trouble.

The foregoing objects and new features of the present invention will be better understood from the following description when considered with the accompanying drawing figures.

BRIEF DESCRIPTION OF THE DRAWINGS

Preferred embodiments of this invention are illustrated with reference to the accompanying drawings in which.

DETAILED DESCRIPTION OF THE INVENTION

With reference to the accompanying drawings, preferred embodiments of the present invention are now described below.

Figure 1:
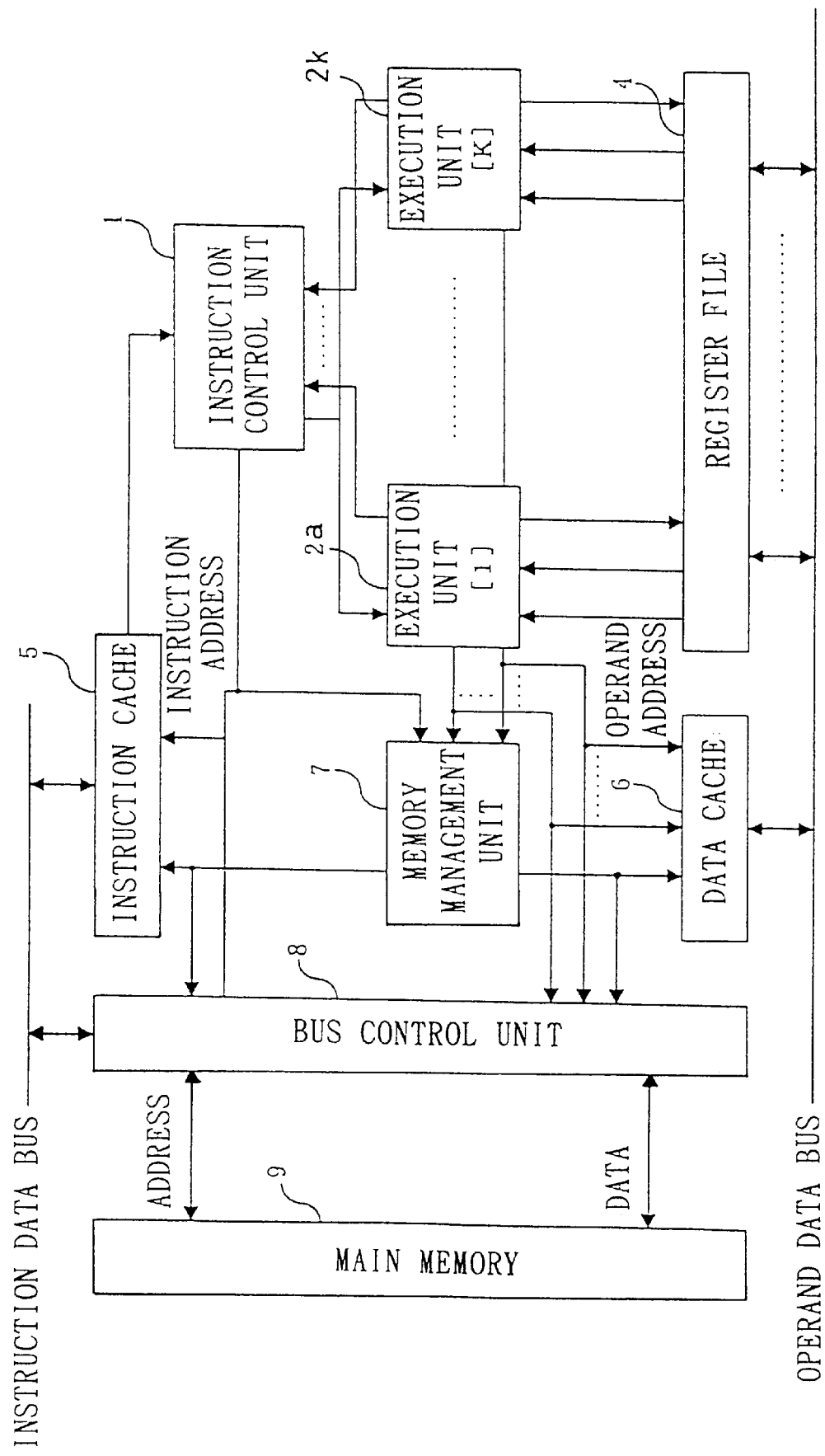
FIG. 1 shows in block form an entire configuration of a VLIW instruction processor in accordance with an embodiment of the present invention.

FIG. 1 is a diagram schematically illustrating the entire configuration of a VLIW instruction processor of the present invention. Before starting describing the present invention, the term "instruction" and the term "VLIW instruction" are defined. The term "instruction" means a task assigned either to an execution unit that is an element of a VLIW instruction processor or to a plurality of execution units. The term "VLIW instruction" means either a single instruction or a set of instructions identified by a compiler to logically be executed by a VLIW processor at the same time.

With reference to FIG. 1, 1 is an instruction control unit (ICU), 2a–2k are a plurality K of execution units (processors), 4 is a register file, 5 is an instruction cache, 6 is a data cache, 7 is a memory management unit (MMU), 8 is a bus control unit (BCU), and 9 is a main memory.

ICU 1 fetches instructions from instruction cache 5, interprets the instructions, and instructs execution units 2a–2k to start executing the instructions. In addition, ICU 1 controls the execution of instructions in execution units 2a–2k.

Each execution unit 2a–2k, in response to an instruction execution start instruction issued from ICU 1, starts executing an instruction, gets a necessary operand from register file 4, and writes a result of the instruction execution into register file 4. In executing a LOAD INSTRUCTION for the loading of an operand to register file 4, each execution unit 2a–2k sends a LOAD REQUEST and an operand address to MMU 7. On the other hand, in executing a STORE INSTRUCTION for the storing of an operand from register file 4, each execution unit 2a–2k sends a STORE REQUEST and an operand address to MMU 7. In addition, each execution unit 2a–2k sends to ICU 1 branch-is-taken/branch-is-not-taken information and a branch address.

Further, each execution unit 2a–2k sends to ICU 1 information about the presence or absence of its own failure. Failure is roughly divided into two types, one that is detected by post-LSI fabrication testing (hereinafter referred to as the initial failure) and another caused by characteristic degradation after a long period of service time (hereinafter referred to as the operating failure).

Figure 2:
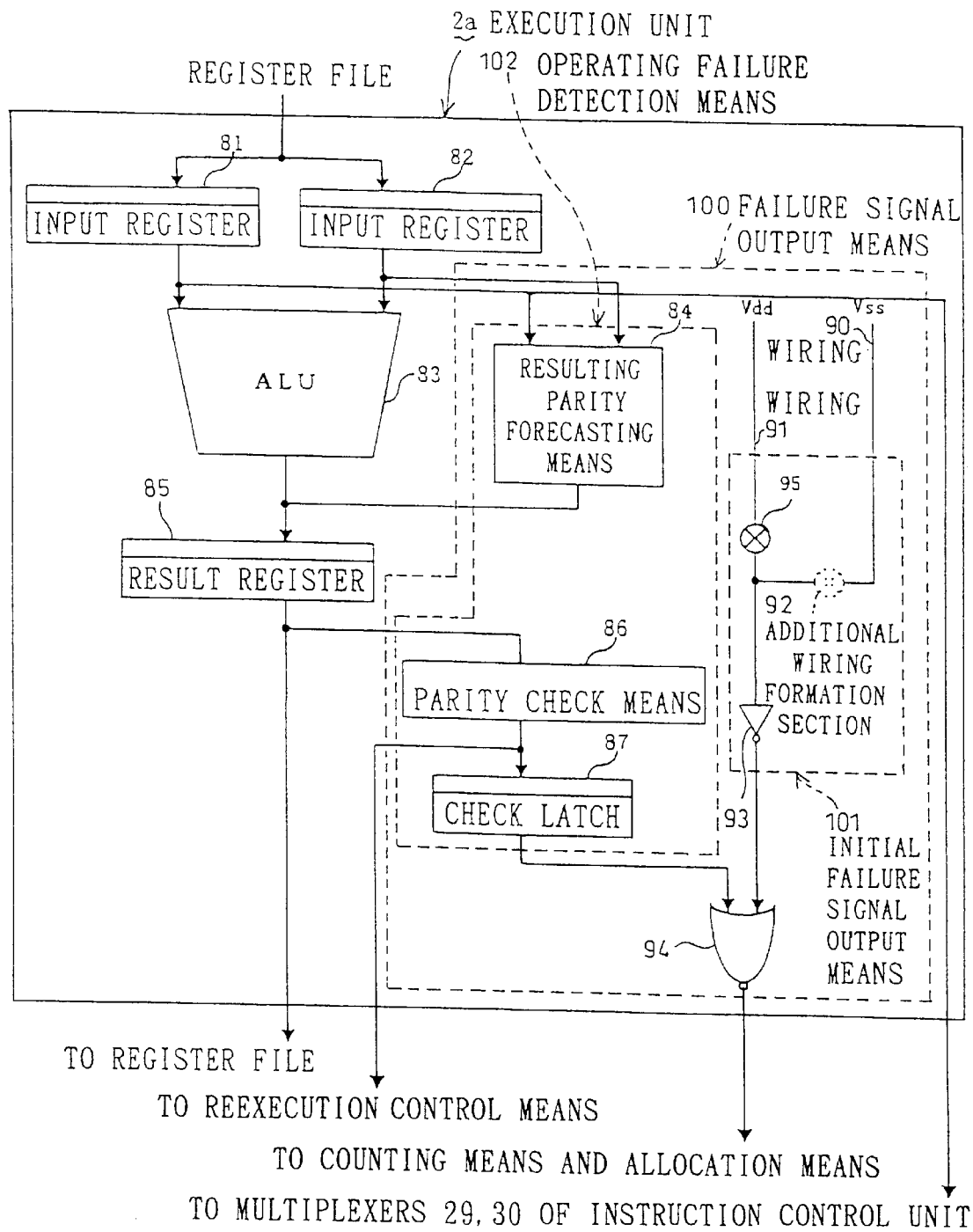
FIG. 2 shows in block form an internal configuration of an execution unit of the VLIW instruction processor.

FIG. 2 illustrates a structure for each execution unit 2a–2k.

81 and 82 are input registers. 83 is an arithmetic and logic unit (ALU). 85 is a result register. 100 is a failure signal output means (FSOM) which sends a failure signal when a failure occurs to its own execution unit 2. FSOM 100 has an initial failure signal output means (IFSOM) 101 and an operating failure detection means (OFDM) 102. IFSOM 101 provides an initial failure signal when a failure is found in its own execution unit 2 by post-fabrication failure detection testing. OFDM 102 detects whether a failure occurs in its own execution unit 2 during the operation thereof and, when detected, provides an operating failure detection signal.

Input registers 81 and 82 store respective operands for arithmetic logic operations (ALOs) outputted from register file 4 of FIG. 1. Both of the operands are fed to ALU 83. When an operand is a single instruction such as ALO INSTRUCTION, LOAD INSTRUCTION, STORE INSTRUCTION, BRANCH INSTRUCTION, and VLIW INSTRUCTION WORD LENGTH REWRITE INSTRUCTION, an operand, a memory address, a branch destination address, a VLIW instruction word length are read out from register file 4 and they are stored only in input register 81. Input register 81, which is coupled to data cache 6, to MMU 7 and to BCU 8 (not shown in the figure), feeds to them memory addresses for LOAD and STORE INSTRUCTIONS.

IFSOM 101 has wiring 90 through which to provide an initial failure signal and wiring 91 through which to provide a signal indicative of the absence of a failure. Wiring 90 has an empty section 92 formed by removing a part of wiring 90 for additional wiring formation. Vss, the ground potential, is applied to wiring 90 and Vdd of high potential is applied to wiring 91. Wiring 90 and wiring 91 are merged into a single line for communication with ICU 1 through inverter 93 and NOR circuit 94. When no initial failure is detected, Vdd (logical 1) is applied through wiring 91 to inverter 93, and the output of inverter 93 becomes logical 0. This logical 0 becomes a signal indicative of the absence of an initial failure. On the other hand, when an initial failure is detected, fuse 95, arranged in wiring 91, is cut by means of FIB (focused ion beam) and an extra wiring is added to additional wiring formation section 92. Accordingly, at the time of finding that initial failure, Vss (logical 0) is applied through wiring 90 to inverter 93. As a result, the output of inverter 93 becomes logical 1, and this logical 1 becomes a signal indicative of the presence of an initial failure.

OFDM 102 has parity forecasting means (PFM) 84, parity check means (PCM) 86, and check latch 87. PFM 84 is a means for forecasting the parity of ALU's 83 arithmetic operation results. PCM 86 is a means for making a comparison between the parity predicted by PFM 84 and the parity of actual arithmetic operation results found by ALU 83. Check latch 87 is a means for latching a result of the check operation by PCM 86. Check latch 87 is reset to logical 0 at the time of initialization and provides it as its output. Therefore, at the time when IFSOM 101 provides a signal at logical 0 indicative of the absence of an initial failure, NOR circuit 94 provides failure information at logical 1 representing that there is no initial failure. On the other hand, at the time when IFSOM 101 provides an initial failure signal at logical 1, NOR circuit 94 provides failure information at logical 0 representing that there is an initial failure.

In post-LSI fabrication failure detection testing, execution units are made to operate and OFDM 102 checks them for the presence or absence of an initial failure. If no initial failure is detected, OFDM 102 detects a failure, if any, in its own execution unit due to characteristic degradation with a long period of service time. When an initial failure is detected by OFDM 102, IFSOM 101 is then used to permanently provide an initial failure signal.

The detecting of passage-of-time (POT) failures is described. Items of data, each of which comprises 32+4 bits (that is, a parity bit is added in units of 8 bits), are stored such that the number of the data items corresponds to the number of registers of register file 4. When the number of operand data read out of register file 4 is two (that is, in the case of instructions such as add instruction, subtraction instruction, comparison instruction, AND instruction, OR instruction and XOR instruction), the operand data are stored in input registers 81 and 82. ALU 83 uses these data to perform arithmetic operations. On the other hand, when the number of data items read out of register file 4 is one (that is, in the case of instructions such as complementation instruction, logical NOT instruction, shift instruction and rotate instruction, the operand data is stored in input register 81. ALU 83 uses the operand data to perform arithmetic operations. At the execution time of these arithmetic operations, PFM 84 receives operand data which are used in ALU 83 so as to forecast the parity of results of the arithmetic operation in ALU 83 for every 8 bits. The actual result of the arithmetic operation and the predicted parity are stored in result register 85. For the case of instructions requiring no arithmetic operations in ALU 83 such as STORE INSTRUCTION, BRANCH INSTRUCTION, and VLIW INSTRUCTION WORD LENGTH REWRITE INSTRUCTION, data from register file 4, i.e., memory address, branch destination address and VLIW instruction word length, are stored in input register 81. After passing through ALU 83 without undergoing arithmetic operations therein, the data are stored in result register 85 and are fed to PFM 84. A parity of four bits, appended to data of 32 bits outputted from input register 81, is provided intact from PFM 84 as a parity forecasting result to be stored in result register 85.

PCM 86 performs a parity check. If the parity check shows that an error is found (that is, there is a POT failure in ALU 83), PCM 86 then sends an operating failure detection signal at logical 1. On the other hand, if the parity check shows that no error is found, PCM 86 then provides a signal at logical 0. The output of PCM 86 is taken into check latch 87. The output of check latch 87 is transferred to NOR circuit 91. NOR circuit 91 provides a logical 1 output indicative of the absence of a failure when inputting, from check latch 87, a value of logical 0 indicative of the absence of a POT failure at the time when IFSOM 101 sends a signal at logical 0 indicative of the absence of a failure. On the other hand, NOR circuit 91 provides a logical 0 output indicative of the presence of a failure when inputting, from check latch 87, an operating failure detection signal at logical 1. This logical 0 is fed to ICU 1 of FIG. 1. Various malfunction detecting methods for computers have been proposed. For example, F. F. Sellers, Jr. M. Y. Hsiao and L. W. Bearnson show a method in their work entitled "Error detecting logic for digital computers," published by Mcgraw-Hill Book Company in 1968.

Figure 7:
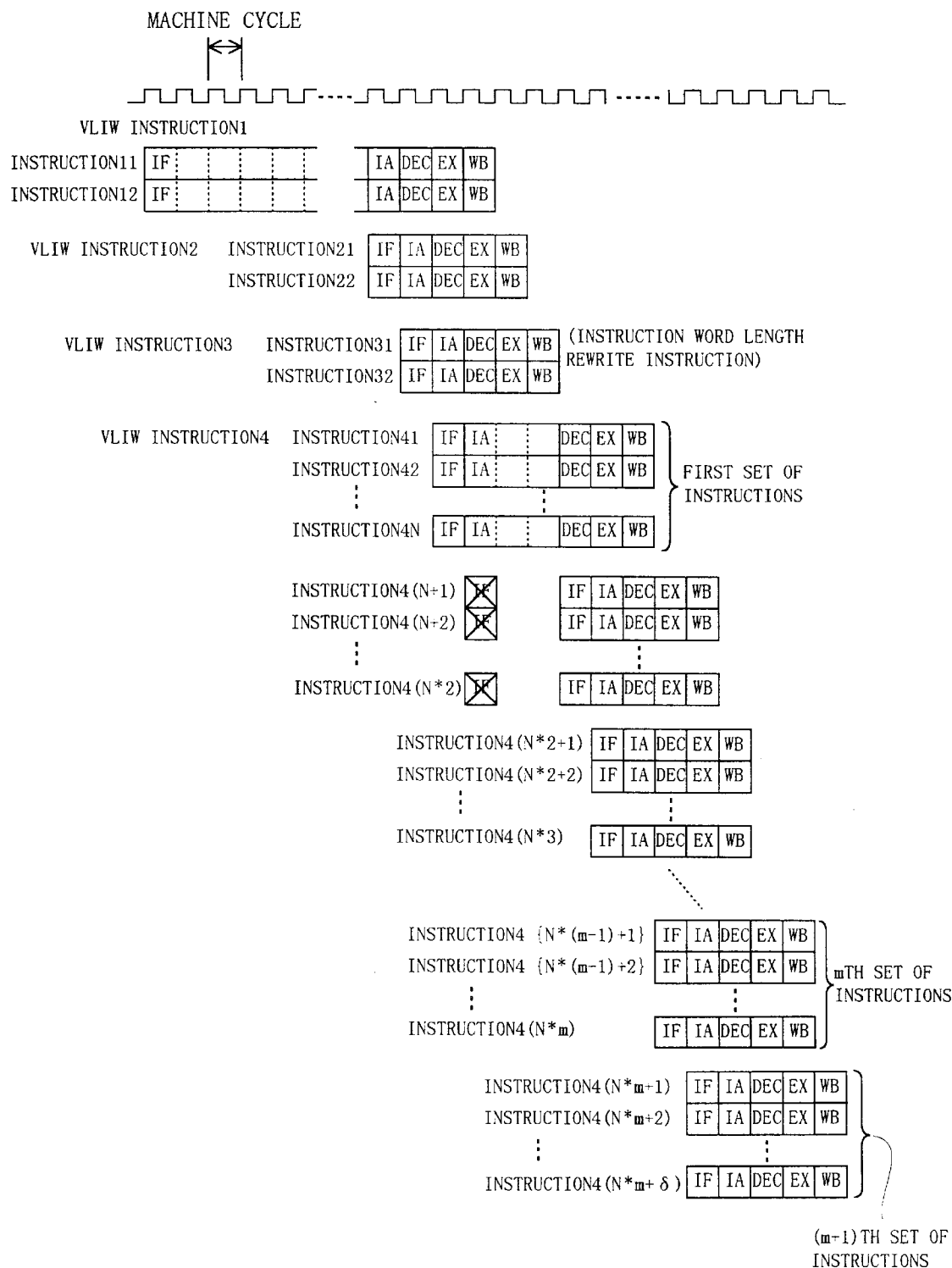
FIG. 7 shows a first example useful in understanding the effect of a VLIW instruction word length rewrite instruction on the pipeline operation of a variable word length VLIW instruction processor.

MMU 7 of FIG. 7 determines whether or not instruction cache 5 stores an instruction that corresponds to an instruction fetch request address from ICU 1. If instruction cache 5 does not store the instruction in question, MMU 7 issues to BCU 8 a request of the transfer of the data from main memory 9. When execution unit 2 request the loading of an operand to register file 4, MMU 7 determines whether there exists corresponding data to such a load request in data cache 6. If not, MMU 7 issues to BCU 8 a request of the transfer of the data in question from main memory 9. Further, MMU 7, when execution unit 2 issues a request of the storing of an operand from register file 4, determines whether or not data cache 6 holds data which is rewritten and which corresponds to such a store request's address. If data cache 6 stores the data in question, then data from register file 4 is written in data cache 6. Additionally, MMU 7 issues to BCU 8 a request of the storing of the data in question in main memory 9, regardless of the presence or absence of the data in question to be rewritten in data cache 6.

Figure 3:
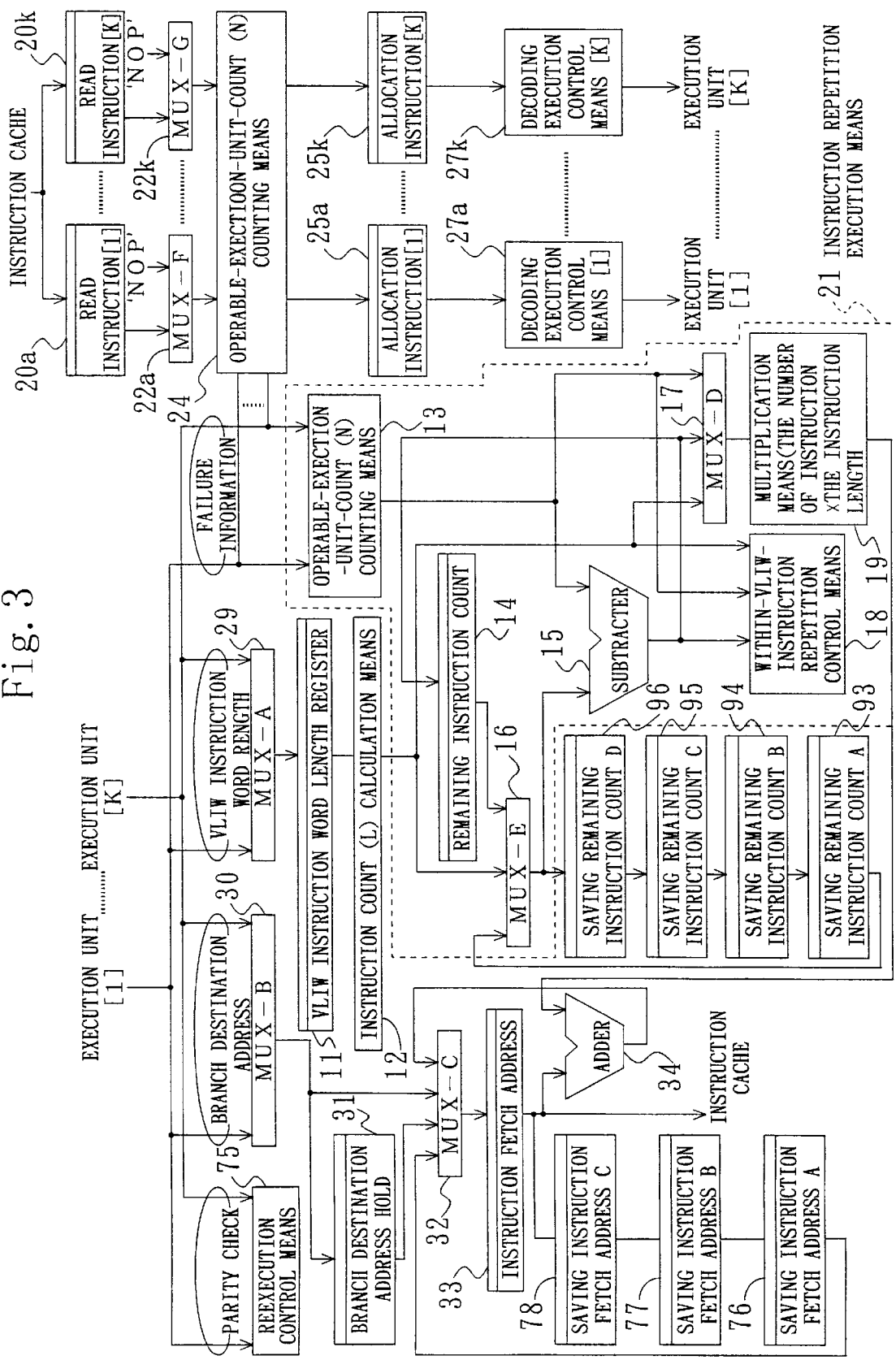
FIG. 3 shows in block form an internal configuration of an instruction control unit of the VLIW instruction processor.

FIG. 3 illustrates an internal configuration of ICU 1. ICU 1, not fixedly but variably, controls a VLIW instruction word length. The number of instructions contained in a single VLIW INSTRUCTION is computed from its instruction word length. If the number of instructions contained in one VLIW INSTRUCTION exceeds the number of execution units (k execution units), the execution of these instructions are divided into a plurality of execution processes. On the other hand, if the number of instructions contained in one VLIW INSTRUCTION is below the number k, these instruction are executed, only in some of the k execution units.

Referring still to FIG. 3, 11 is a VLIW instruction word length register 11 (hereinafter simply referred to as IWLR 11) for storing instruction word lengths of received VLIW INSTRUCTIONS. 12 is a calculation means 12 for computing the number of instructions contained in one VLIW INSTRUCTION (i.e., the number of instructions to be executed at the same time). 13 is a count means for counting the number of normally operable execution units (i.e., execution units without a failure).

By an IPL (initial program loader), a VLIW instruction word length for an object program which is executed first after the IPL is completed, is set to IWLR 11 as an initial value. The term "IPL" means, in a narrow sense, loading of a program such as a loader by any known methods, when no programs are loaded in main memory 9, and it further means a series of operations including (a) the initial setting and testing of a processor prior to the loading is carried out, (b) a program is loaded when the processor is determined to operate normally, and (c) control is provided such that the processor starts executing the loaded program. IPL is executed either after the processor is turned on or after the processor is system-reset.

The operation of calculation means 12 for computing the number of instructions is described. A plurality of instructions contained in a VLIW INSTRUCTION are specified by the same bit length. A VLIW INSTRUCTION takes a format in which a plurality L of instructions queue. In some formats, however, a VLIW INSTRUCTION is formed either by adding start data at its front end or by adding termination data at its rear end. The adoption of theses VLIW instruction formats facilitates establishing a one-to-one correspondence between the VLIW instruction word length and the number of instructions, L. In the present embodiment, a VLIW INSTRUCTION is made up of L instructions each having a length of four bytes, and calculation means 12 shifts a VLIW instruction word length outputted from IWLR 11 to the right two bits, to find L (i.e., the number of instructions).

Figure 4:
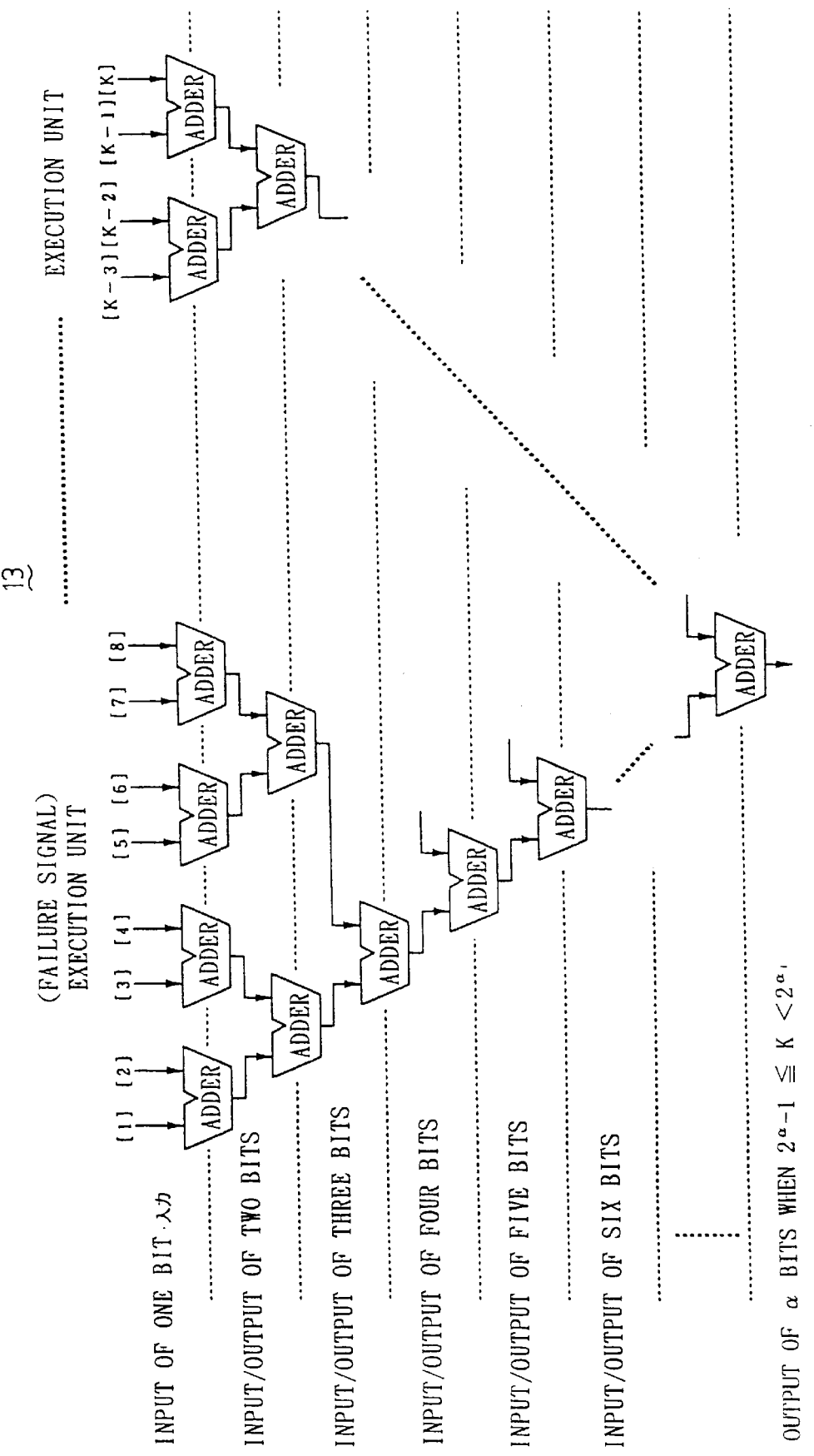
FIG. 4 shows an internal configuration of a count means for counting the number of operable execution units of the VLIW instruction processor.

Count means 13 receives signals from NOR circuits 94 in execution units 2a–2k and counts the number of normally operable execution units of the k execution units, N, wherein signals indicative of the absence of a failure are taken as logical 1 while signals indicative of the presence of a failure are taken as logical 0. FIG. 4 shows an example of the configuration of count means 13.

In FIG. 3, read instruction registers (RIRs) 20a–20k are provided as many as the execution units 2a–2k, that is, a plurality k of RIRs 20 are provided. RIRs 20a–20k store k instructions forming a VLIW INSTRUCTION outputted from instruction cache 5. Multiplexers 22a–22k, each of which having two inputs and one output, are provided as many as RIRs 20a–20k. Each multiplexer 22 receives an instruction stored in a corresponding RIR 20 and a no-operation instruction (NOP INSTRUCTION), selects between the received instructions, and provides the selected one. Such selection is directed by within-VLIW-instruction repetition control means 18 (hereinafter simply referred to as RCM 18).

Referring still to FIG. 3, 24 is an operable execution unit selection/allocation means or an instruction allocation means (hereinafter simply referred to as IAM 24). IAM 24 allocates to faulty execution units (i.e., execution units with a failure) NOP instructions. On the other hand, IAM 24 allocates to normally operable execution units (i.e., execution units without a failure) instructions stored in RIRs 20a–20k sequentially from the leading one (i.e., an instruction in the leading position of the instructions stored in RIRs 20a–20k). FIG. 4 shows an internal configuration of IAM 24. IAM 24 is described later in detail. Allocation instruction registers (AIRs) 25a–25k are provided as many as execution units 2a–2k. AIRs 25a–25k store instructions which are allocated by IAM 24 to the normally operable execution units. Further, decoding/execution control means (DECM) 27a–27k are provided as many as the number of execution units 20a–20k. Each DECM 27 decodes an instruction stored in a corresponding AIR 25 and controls a corresponding execution unit 2.

In FIG. 3, 14 is a remaining instruction-count register (RICR) for storing the number of instructions which have remained unexecuted (i.e., the number of instructions other than ones which have already executed). 16 is a multiplexer with three inputs and one output. Basically, multiplexer 16 first selects the number of instructions of one VLIW INSTRUCTION calculated by calculation means 12 and then selects the number of remaining unexecuted instructions stored in RICR 14. 15 is a subtracter (subtraction mans). Subtracter 15 performs an operation of subtracting the output of count means 13 (i.e., the number of normally operable execution units for use in arithmetic operations) from the output of multiplexer 16 (i.e., the number of initial instructions or the number of remaining unexecuted instructions), to calculate a current remaining unexecuted instruction count. The output of subtracter 15 is stored in RICR 14.

RCM 18 of FIG. 3, which is a repetition control means, receives L from calculation means 12, R from RICR 14, and N from count means 13 where L is the number of instructions contained in one VLIW INSTRUCTION (the number of initial remaining unexecuted instructions), R is the number of remaining unexecuted instructions and N is the number of normally operable execution units. RCM 18 controls the entire inside of ICU 1.

(1) If L is less than or equal to N (L≦N), then L instructions are allocated to L normally operable execution units.

(2) If L is greater than N (L>N), either N instructions are allocated to N normally operable execution units when R≧N, or R instructions are allocated to R normally operable execution units when 0<R<N.

RCM 18 controls multiplexer 16 as follows. When an instruction, which is located in the leading position of a set of instructions contained in a first VLIW INSTRUCTION, is executed after IPL or when R is less than or equal to N (R≦N), RCM 18 directs, at a subsequent cycle, multiplexer 16 to select an output from calculation means 12. On the other hand, when R>N, RCM 18 directs multiplexer 16 to select an output from RICR 14.

RCM 18 further controls a multiplexer 17 with three inputs and one output to select the number of instructions processed by a single arithmetic execution processing. More specifically, in processing one VLIW INSTRUCTION, RCM 18 controls multiplexer 17 to select N representing the number of normally operable execution units outputted from count means 13 as long as R≧N holds. On the other hand, if 0<R<N, RCM 18 then controls multiplexer 17 to select R representing the number of remaining unexecuted instructions. Additionally, if L≦N. multiplexer 17 is controlled by RCM 18 to select L outputted from calculation means 12.

19 of FIG. 3 is a multiplier. Multiplier 19 calculates an increment in the instruction fetch address, in other words multiplier 19 performs an operation of multiplying an output from multiplexer 17 and four (in the present embodiment a shift of two bits to the left is carried out and two low-order bits are set to zero).

When L (the number of instructions to be executed at the same time computed by calculation means 12) is in excess of the number of normally operable execution units counted by count means 13, RICR 14, subtracter 15, multiplier 19, and RCM 18 are used to form an instruction repetition execution means (IREM) 21, whereby the execution of the aforesaid instructions to be executed at the same time is divided so that they are executed at a plurality of times by the normally operable execution units.

Figure 5:
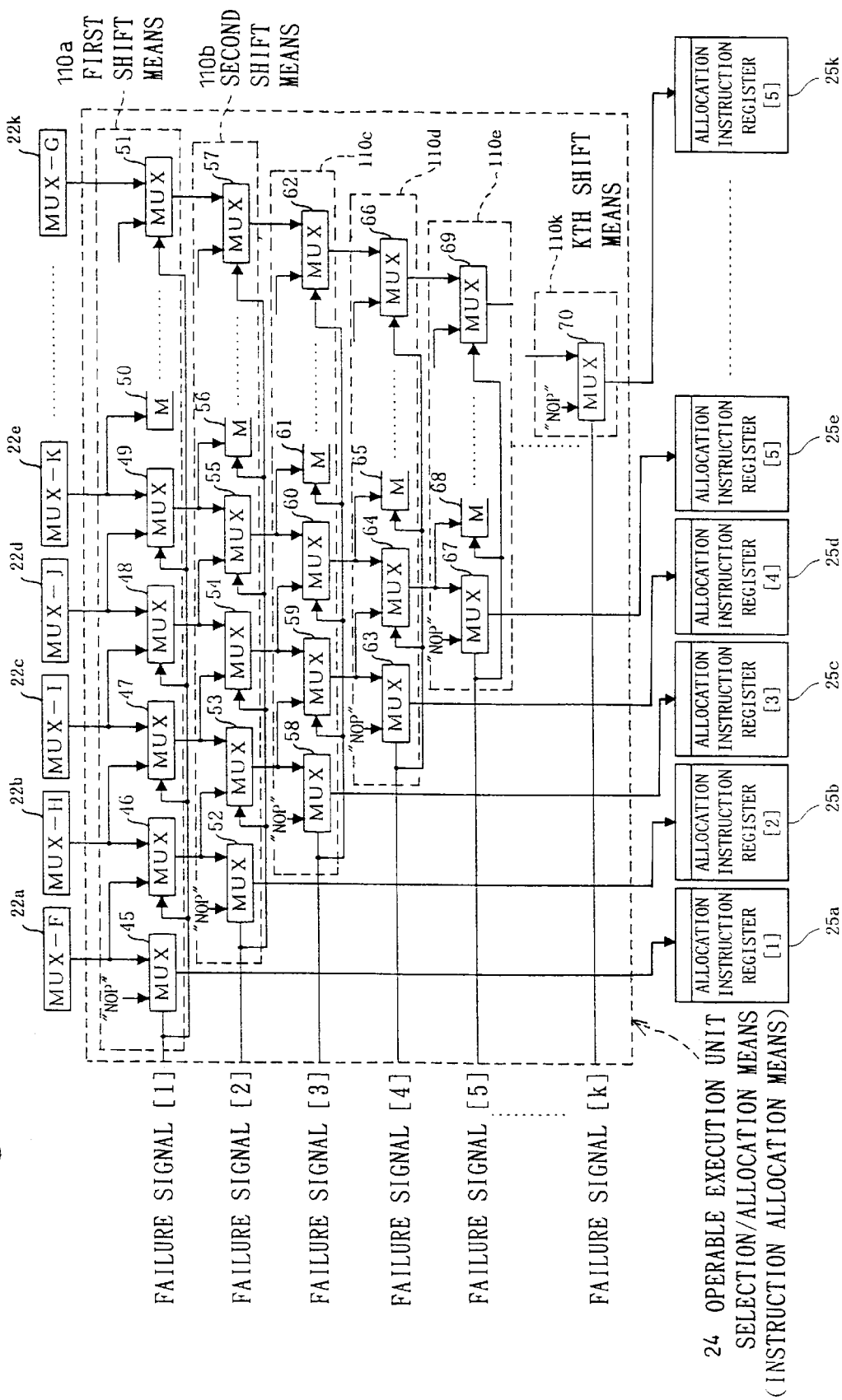
FIG. 5 shows an internal configuration of an operable execution unit selection/allocation means of the VLIW instruction processor.

An example of the configuration of IAM 24 of FIG. 5 is described. IAM 24 has a plurality k of shift means 110a–110k (the number of shift means 110 is equal to the number of execution units 2). The kth shift means, i.e., the lowermost shift means 110k, is provided with one selector 70. The remaining shift means 110 each have a plurality of selectors of selectors 45–69. Shift means 110a, i.e., the uppermost shift means, has selectors 45–51 corresponding to the number of instructions read out of instruction cache 5 (k instructions). Each of the second to (k−1)th shift means is provided with selectors the number of which is less, by one, than the number of selectors placed in its overlying shift means. Each selector 45–70 is formed by a multiplexer with two inputs (first and second inputs) and one output.

Basically, each selector 45–51 receives, at the first input, an instruction stored in a corresponding RIR 20 through a corresponding multiplexer 22. Selector 45, which is the leading selector, receives at the second input, a NOP INSTRUCTION. Each of the remaining selectors 46–51 receives, at the second input, an instruction applied at the first input of its adjoining selector located on the left-hand side thereof. Each selector 45–51 is controlled either by an initial failure signal or by an operating failure signal from the first execution unit 2a which is indicated as a failure signal (1) in FIG. 4. More specifically, each selector 45–51, in response to a failure signal, selects an instruction applied at the first input, while on the other hand each selector 45–51 selects an instruction applied at the second input at the time of receiving no failure signal. The output of selector 45 (the leading selector) is applied to AIR 25a (the leading AIR). The outputs of selectors 46–51 are applied to second shift means 110b. To sum up, in the absence of a failure signal from a corresponding execution unit (i.e., execution unit 2a), first shift means 110a stores, in AIR 25a, an instruction in the leading position of a set of instructions stored in RIR 20a, and outputs the remaining instructions to second shift means 110b. On the other hand, in the presence of a failure signal from first execution unit 2a, first shift means 110a stores a NOP INSTRUCTION in AIR 25a and the received k instructions are transferred intact to second shift means 110b.

The above-described operations are also applied in the second to kth shift means, i.e., shift means 110b–110k. In the absence of a failure signal from a corresponding execution unit, each shift means stores, in a corresponding AIR, an instruction stored in a corresponding RIR, and outputs the remaining instructions to a subsequent shift means. On the other hand, in the presence of a failure signal from a corresponding execution unit, each shift means stores a NOP INSTRUCTION in a corresponding AIR and outputs all the received instructions to a subsequent shift means.

IAM 24 allocates a NOP INSTRUCTION to each of (K−N) faulty execution units. On the other hand, IAM 24 allocates, to the N remaining, normally operable execution units, first N instructions of the K instructions stored in RIRs 20a–20k. The remaining (K−N) instructions remain unused and are shifted out, and will be included as a front part of K instructions at subsequent instruction fetch.

29 is a multiplexer with k inputs and one output (see FIG. 3). When a VLIW INSTRUCTION contains therein a rewrite instruction for rewriting an instruction word length and when the rewrite instruction is executed by one of the k execution units, multiplexer 29 selects a VLIW instruction word length outputted from input register 81 of the execution unit in question (see FIG. 2), for forwarding to IWLR 11. 30 is a multiplexer with k inputs and one output. When any one of the input registers 81 of the execution units provides a branch destination address, Multiplexer 30 selects the branch destination address for forwarding to a branch destination address hold register (BDAHR) 31.

In FIG. 3, 33 is an instruction fetch address register (IFAR) for storing a leading address for an instruction to be fetched. 34 is an adder. Adder 34 performs an operation of adding an output from IFAR 33 and an increment in the instruction fetch address outputted from multiplier 19. Basically, the result of the add operation in adder 34 is selected by a multiplexer 32 with four inputs and one output and is then restored in IFAR 33. When an input register 81 of any one of the execution units provides a branch destination address, this branch destination address or another branch destination address held in BDAHR 31 is selected in multiplexer 32. The selected branch destination address is stored in IFAR 33.

In FIG. 3, 75 is a reexecution control means (RCM). In response to the output of PCM 86 of an execution unit of FIG. 2, RCM 75 controls the entire inside of ICU 1 so that a set of instructions including an instruction under execution is reexecuted at the beginning, when a POT failure occurs in the execution unit. To achieve this, three saving instruction fetch address register (SIFAR) 76–78 and four saving remaining instruction-count registers (SRICR) 93–96 are provided. Any one of saving instruction fetch addresses stored in SIFARs 76–78 and any one of saving remaining instruction counts stored in SRICR 93–96 are selected to the pipeline stage advancement, and the selected saving instruction fetch address and the selected saving remaining instruction count are taken into multiplexer 32 and into multiplexer 16, respectively.

K instructions outputted from instruction cache 5 are stored in RIRs 20a–20k. Each multiplexer 22a–22k is controlled by RCM 18 to select between an instruction stored in an RIR 20 and a NOP instruction. Cases, in which RCM 18 controls multiplexer 22 to select a NOP instruction, are as follows: (a) when the K instructions from instruction cache 5 include an instruction that is contained in a subsequent VLIW INSTRUCTION, in other words when, in a VLIW INSTRUCTION under processing, 0<R<N holds so that last (K–R) instructions of the K instructions are contained in a subsequent VLIW INSTRUCTION, (b) when the IA (instruction allocation) stage and the IF (instruction fetch) stage of a subsequent VLIW INSTRUCTION are suppressed in a phase at which rewriting of an instruction word length stored in IWLR 11 by VLIW INSTRUCTION WORD LENGTH REWRITE INSTRUCTION has not been completed, and (c) other situations.

The operation of the present VLIW instruction processor is described with reference to a program shown in FIG. 6.

Each instruction fetch causes instruction cache 5 to provide K instructions and these K instructions are taken into RIRs 20a–20k at the beginning of the IA stage. As previously defined, the term "instruction" means a task assigned by the execution unit, and each execution unit 2a–2k has the ability to execute various types of instructions such as load instructions, store instructions, add instructions, subtraction instructions, compare instructions, complementation instructions, AND instructions, OR instructions, XOR instructions, logical NOT instructions, shift instructions, rotate instructions, branch instructions, and VLIW instruction word length rewrite instructions. The contents of each instruction of four bytes are an arithmetic code, and an operand or operand indication information. For example, an add instruction is composed of an add code, numbers of individual registers which store augends and addends, and register numbers for the storing of add operation results. In a compiler of the present embodiment, an object program is created such that there exists no operand dependency relationship among instructions contained in a single VLIW instruction. Although there is the possibility that all instructions taken into RIRs 20a–20k are add instructions, there are no possibilities that the output of one execution unit serves as input to the other execution unit. Instructions which change the state of an entire processor, such as branch instructions and VLIW instruction word length rewrite instructions, are not contained in a VLIW instruction, and, even when they are contained, both the number of branch instructions and the number of VLIW instruction word length rewrite instructions are limited to one. Accordingly, each RIR 20a–20k contains, at most, one branch instruction and one VLIW instruction word length rewrite instruction.

Operations, when all the execution units are free from initial failures as well as from POT failures, are described. Upon normal completion of an IPL, a number, for example, eight (8) is stored in IWLR 11 as an initial value. A leading address of the program is stored in IFAR 33 by the IPL. ICU 1 issues instruction fetch requests to instruction cache 5 and MMU 7 at the same time, at the time of which there is no effective data in instruction cache 5 so that a series of operations is carried out for the transferring of the data in question from main memory 9 to instruction cache 5.

Thereafter, L=2 representing the number of instructions is outputted from calculation means 12. Multiplexer 16 is controlled by RCM 18 such that multiplexer 16 selects the output of calculation means 12 (i.e., 2) in order that a first instruction of a set of instructions forming a VLIW instruction immediately after the IPL, is executed. In response to a signal informing that fetch request data from MMU 7 has been transferred to instruction cache 5, RCM 18 instructs RIRs 20a–20k to take in respective instructions. Subsequently, RCM 18 controls the first two of multiplexers 22a–22k to select outputs from the first two of RIRs 20a–20k. RCM 18 further controls each of the remaining (K−2) multiplexers to select a NOP instruction. The VLIW instruction processor of the present embodiment operates in pipeline fashion, and its basic pipelining comprises an IF (instruction fetch) stage, an IA (instruction allocation) stage, a DEC (instruction decoding/issue) stage, an EX (execution) stage, and a WB (register write) stage. Normally, an operation in each stage is completed in one cycle.

Figure 6:
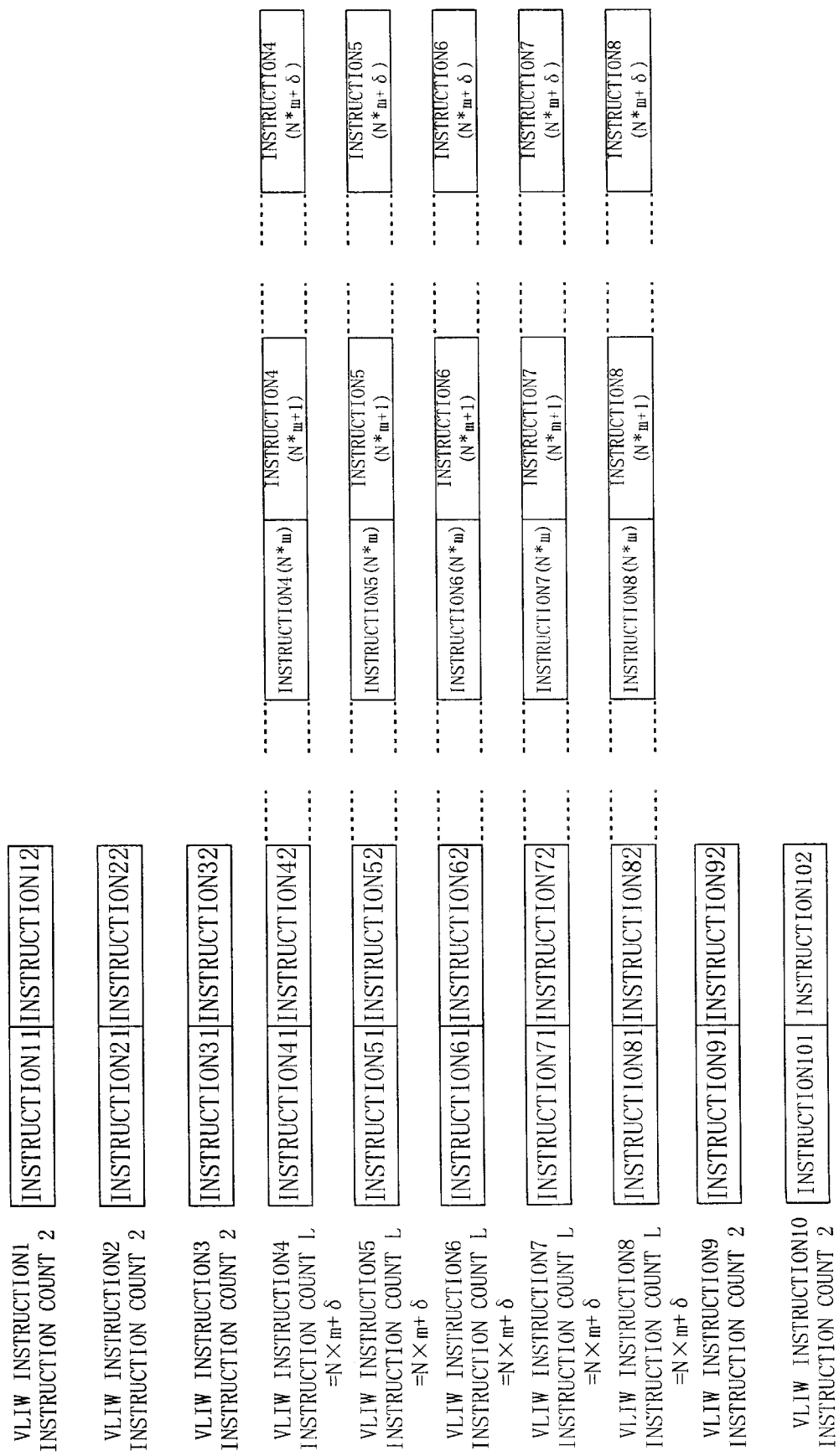
FIG. 6 is a diagram showing an example of variable word length VLIW instructions that is executed by the VLIW instruction processor.

Referring to FIG. 6, each of VLIW INSTRUCTIONS #1, #2, and #3 has two instructions, each of VLIW INSTRUCTIONS #4–#8 has L instructions where L is greater than or equal to N (L≧N), and each of VLIW INSTRUCTIONS #9 and #10 has two instructions.

With reference to FIG. 7, the operation of the VLIW instruction processor for VLIW INSTRUCTIONS #1–#4 is shown. In the IF stage of VLIW INST. #1, there is no effective data in instruction cache 5 so that a series of operations is carried out for the transferring of the data in question from main memory 9 to instruction cache 5, as explained previously. As soon as VLIW INST. #1 proceeds to the IA stage, VLIW INST. #2 proceeds to the IF stage. From then on, the processing of each VLIW INST. #1–#3 proceeds at one cycle pitch of pipelining.

VLIW INST. #3 contains therein a VLIW instruction word length rewrite instruction, and in the DEC stage of VLIW INST. #3 one of the execution units decodes the rewrite instruction for notifying to RCM 18. At this point in time, first K instructions of VLIW INST. #4 have already been read out of instruction cache 5 and these K instructions are taken into RIRs 20a–20k at the beginning of the IA stage thereof (i.e., the DEC stage of VLIW INST. #3). The value, stored in IWLR 11, remains unchanged, in other words the initial value of eight (8) has not been updated. Accordingly, IFAR 33 is fed a value resulting from adding a leading address of VLIW INST. #4 and an output from multiplier 19 (i.e., 8), and it is taken that the number of instructions contained in VLIW INST. #4 is two (2), and VLIW INST. #5 enters the IF stage. Because of the necessity of making a change in the instruction fetch address by the rewrite instruction contained in VLIW INST. #3, RCM 18 cancels the IF stage of VLIW INST. #5 for a while and, at the same time, directs each multiplexer 22a–22k to select a NOP instruction until IWLR 11 stores a new VLIW instruction word length, that is, until the two instructions contained in VLIW INST. #3 enter the WB stage.

At a point in time when the two instructions of VLIW INST. #3 each enter the WB stage, an instruction word length corresponding to L representing the number of instructions, is written into IWLR 11 by the rewrite instruction. Since R representing the number of remaining unexecuted instructions is greater than or equal to N representing the number of normally operable execution units (R≧N), RCM 18 controls multiplexers 22a–22k to select outputs from RIRs 20a–20k in order that the DEC stage for first K instructions (k (the number of execution units)=N (the number of normally operable execution units), which are a fist set of instructions, of VLIW INST. #4, starts at a subsequent cycle. At the same time the DEC stage for the first instruction set (m=1) of VLIW INST. #4 starts, the IF stage for a second set of instructions of VLIW INST. #4 (m-2) is reexecuted.

The program proceeds to the DEC stage of an mth set of instructions (L=N*m+δ;0<δ<N) of VLIW INST. #4 and, at the same time, for an (m+1)th set of instructions of VLIW INST. #4 (last δ instructions) to be executed, RCM 18 controls, at the IA stage thereof, first δ multiplexers of multiplexers 22a–22k to select outputs from corresponding ones of RIRs 20a–20k while controlling the remaining (K–δ) multiplexers to select a NOP instruction. At the beginning of this cycle, an address resulting from adding (N×4) to the leading address of VLIW INST. #4 m times, is already stored in IFAR 33, so that, when an increment (=δ×4) outputted from multiplier 19 is added to this address, a leading address of VLIW INST. #5, is taken into IFAR 33. Subsequently, each VLIW INST. #5, #6, and #7 are executed in the same way that VLIW INST. #4 is executed.

VLIW INST. #8 contains a VLIW instruction word length rewrite instruction. Depending on the location of the rewrite instruction in VLIW INST. #8, the IA stage of VLIW INST. #9 and the IF stage of VLIW INSTRUCTION 10 are suppressed or not suppressed, the manner of which is illustrated with reference to FIGS. 8–10.

Figure 8:
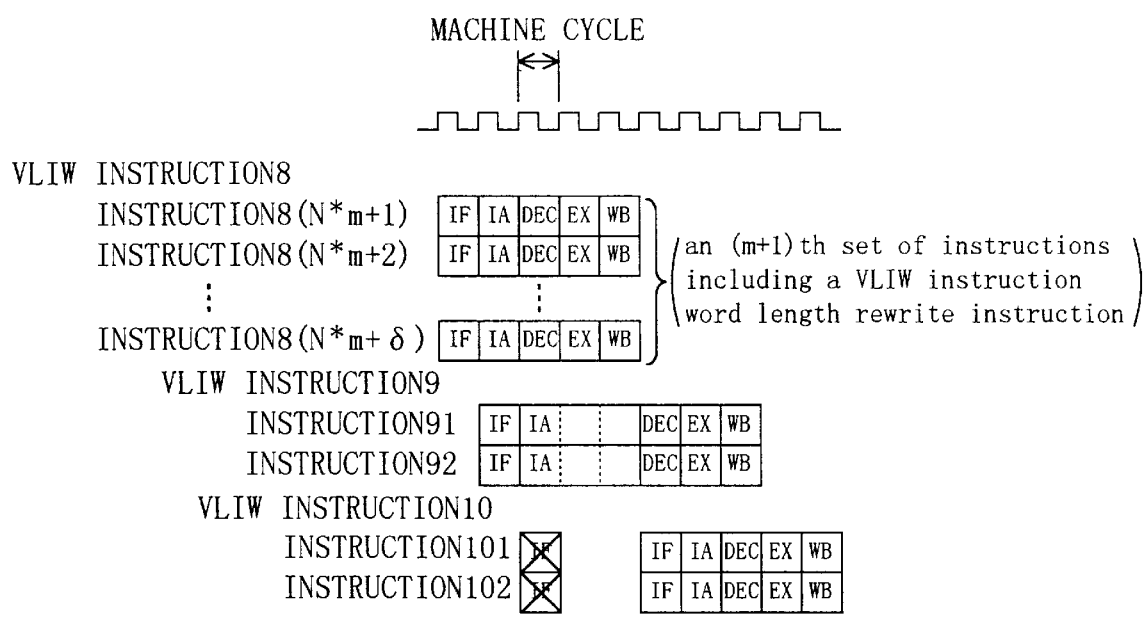
FIG. 8 shows a second example.

Referring first to FIG. 8, a VLIW instruction word length rewrite instruction is contained in a set of instructions (last δ instructions, i.e., an (m+1)th set of instructions) of VLIW INST. #8 that is the last to be processed. If the rewrite instruction is detected in the DEC stage of the instruction set in question, then the IA stage of VLIW INST. #9 is inhibited for a period of two cycles and, at the same time, the IF stage of VLIW INST. #10 is cancelled for a while. At the same time that an instruction word length, stored in IWLR 11, is updated by the aforesaid rewrite instruction at the beginning of the WB stage of the last instruction set of VLIW INST. #8, the IA stage of VLIW INST. #9 restarts, and, at a subsequent cycle, the IF stage of VLIW INST. #10 is reexecuted.

Figure 9:
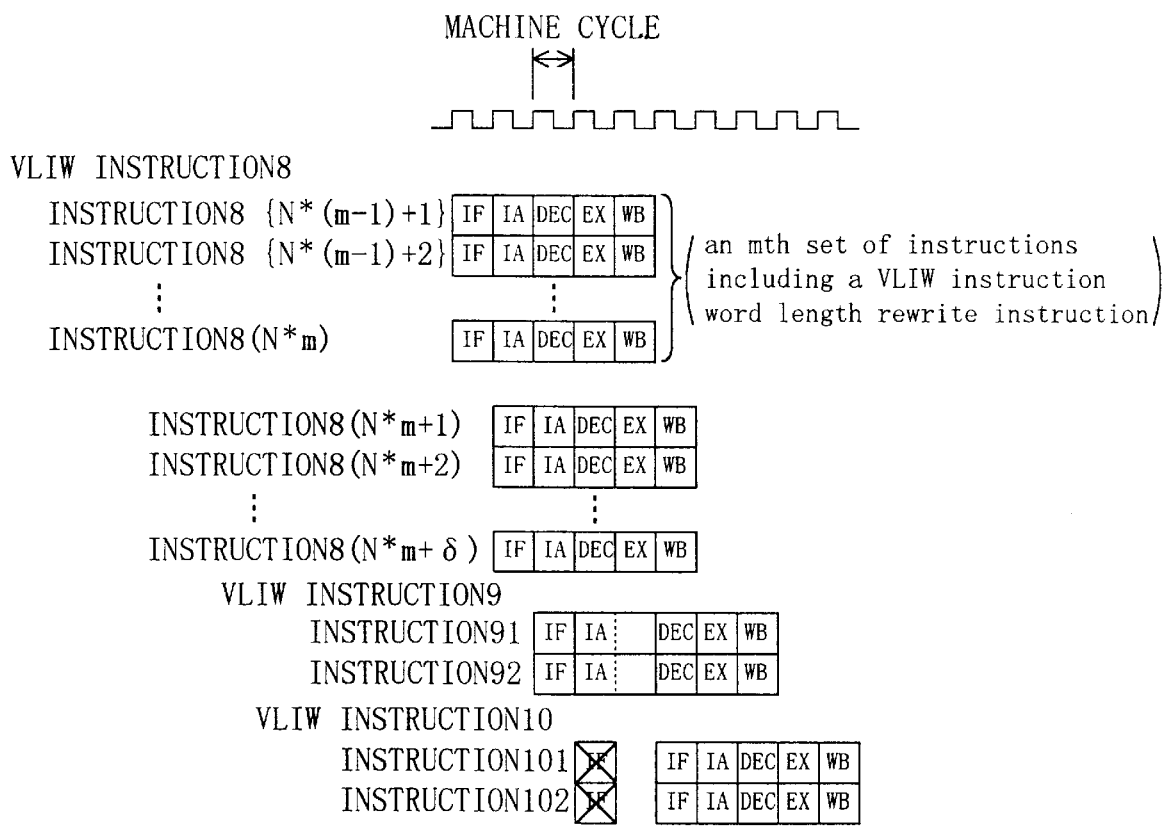
FIG. 9 shows a third example.

Referring now to FIG. 9, a VLIW instruction word length rewrite instruction is contained in a set of instructions (an mth set of instructions) of VLIW INST. #8 that is the last but one to be processed. If the rewrite instruction is detected in the DEC stage of the instruction set in question, then the IA stage of VLIW INST. #9 is inhibited for a period of one cycle and, at the same time, the IF stage of VLIW INST. #10 is cancelled for a while. At the same time that an instruction word length, stored in IWLR 11, is updated at the beginning of the WB stage of the mth instruction set, the IA stage of VLIW INST. #9 restarts, and, at a subsequent cycle, the IF stage of VLIW INST. #10 is reexecuted.

Figure 10:
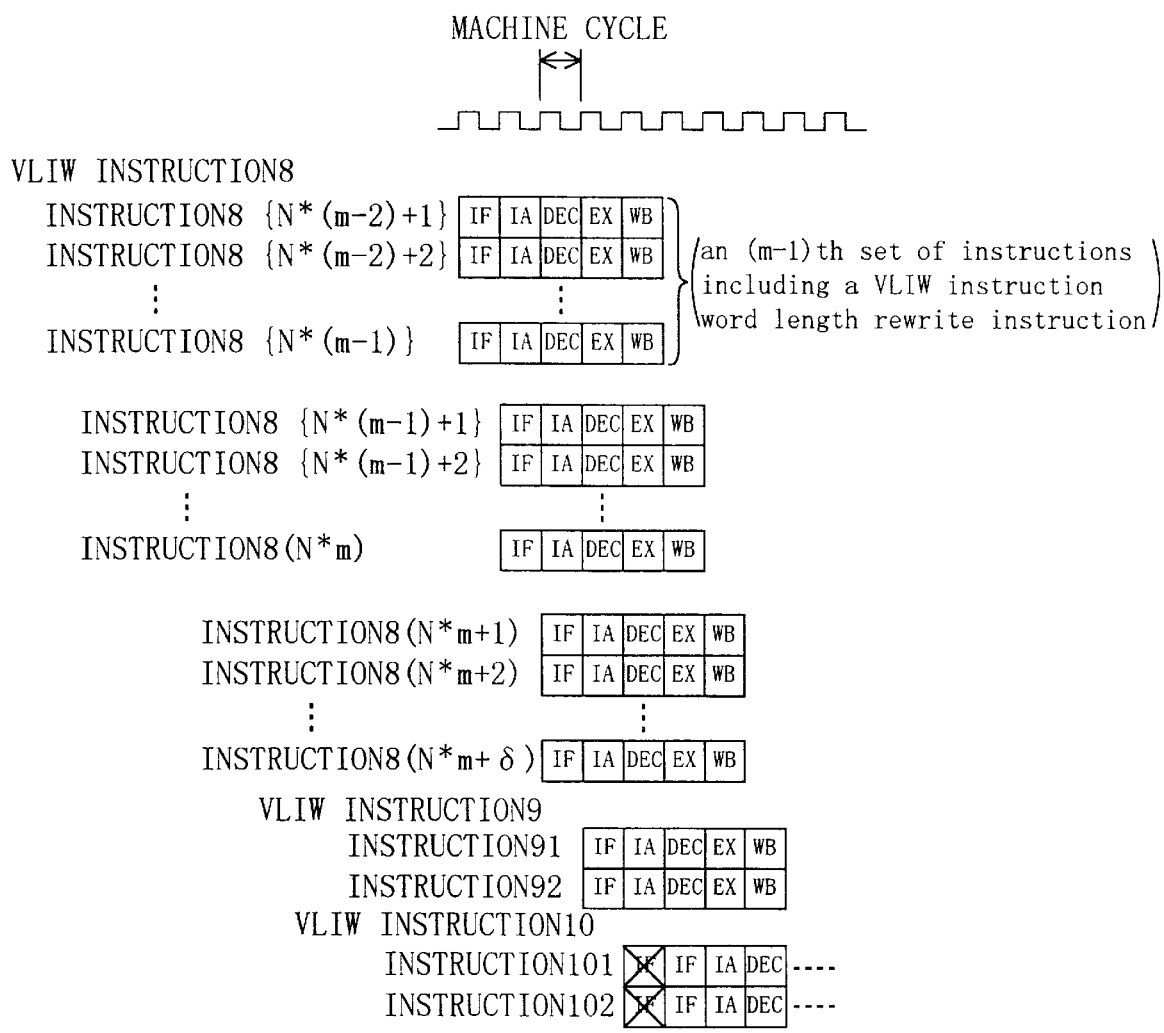
FIG. 10 shows a fourth example.

Referring now to FIG. 10, a VLIW instruction word length rewrite instruction is contained in a set of instructions (an (m–1)th set of instructions) of VLIW INST. #8 that is the last but two to be processed. If the rewrite instruction is detected in the DEC stage of the (m–1)th instruction set, an instruction word length, stored in IWLR 11, is updated at the beginning of the WB stage of the instruction set and, at the same time, the IA stage of VLIW INST. #9 starts. As a result, IF stage inhibition accompanied with the updating of the instruction word length does not occur. However, the IF stage of VLIW INST. #10 is cancelled for a while and is then reexecuted in the next cycle.

Figure 11:
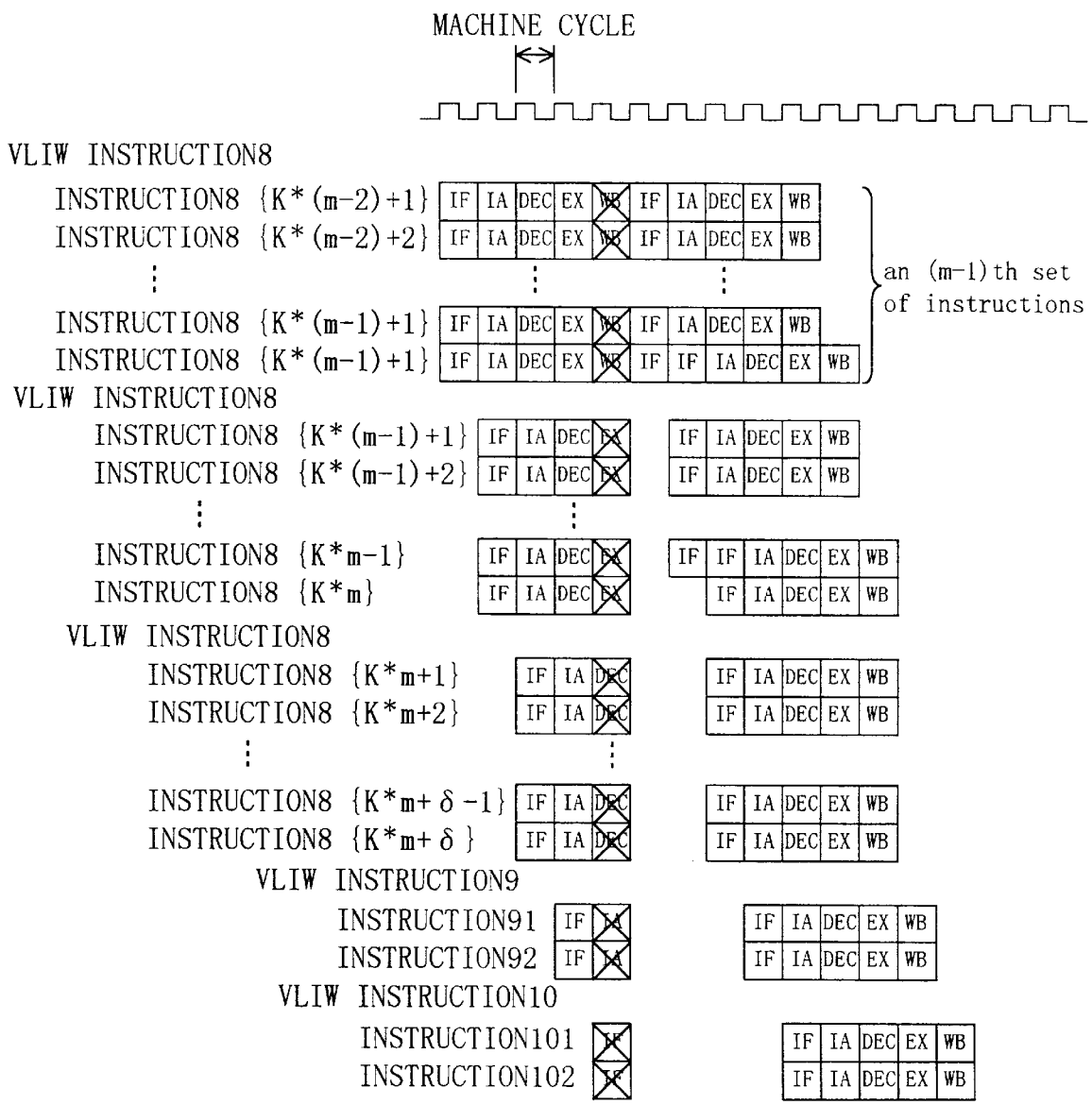
FIG. 11 is a diagram useful in understanding operations at the time when a passage-of-time failure occurs in one execution unit in executing a VLIW instruction.

An example of the situation in which a POT failure occurs in any one of the execution units during the processing of a VLIW instruction and, therefore, the number of operable execution units is reduced, is described. When a POT failure occurs in an execution unit, PCM 86 of FIG. 2 detects the POT failure and NOR circuit 94 generates a failure signal to RCM 75. Based on the received failure signal, RCM 75 learns the existence of the faulty execution unit, inhibits all pipeline stages of the next cycle, controls multiplexer 32 to select an instruction fetch address stored in SIFAR 76 so as to return a leading address of a set of instructions including an instruction in which the failure has occurred, to IFAR 33. RCM 75 further controls multiplexer 16 to select the number of remaining unexecuted instructions stored in SRICR 93 and instructs RCM 18 to bring the control state of the VLIW instruction back to one corresponding to a leading instruction of the instruction set including the instruction in which the failure occurred, to reexecute the fetching of instructions following the leading instruction. This is explained with reference to pipeline stages shown in FIG. 11.

The VLIW instruction process has successfully been operated with no failures occurring in any one of the execution units 20a–20k during the FIG. 5 program processing. However, suppose here that a POT failure occurs in execution unit 2a at the time of the EX stage of an instruction 8 [K*(m–2)+2] contained in the (m–1)th instruction set of VLIW INST. #8. When PCM 86 of execution unit 2a sends, to RCM 75 of FIG. 2, information indicative of the POT failure, all the pipeline stages at the next cycle are inhibited (in the figure these stages are crossed off).

WB STAGE OF INST. 8 [K*(m–2)+1] OF VLIW INST. #8
WB STAGE OF INST. 8 [K*(m–2)+2] OF VLIW INST. #8
WB STAGE OF INST. 8 [K*(m–1)] OF VLIW INST. #8
EX STAGE OF INST. 8 [K*(m–1)+1] OF VLIW INST. #8
EX STAGE OF INST. 8 [K*(m–1)+2] OF VLIW INST. #8
EX STAGE OF INST. 8 [K*(m)] OF VLIW INST. #8
DEC STAGE OF INST. 8 [K*m+1)] OF VLIW INST. #8
DEC STAGE OF INST. 8 [K*m+2] OF VLIW INST. #8
DEC STAGE OF INST. 8 [K*m+δ] OF VLIW INST. #8
IA STAGE OF INST. 91 OF VLIW INST. #9
IA STAGE OF INST. 92 OF VLIW INST. #9
IF STAGE OF INST. 101 OF VLIW INST. #10
IF STAGE OF INST. 102 OF VLIW INST. #10

At the same time that an instruction address for INST. 8 [K*(m–2)+1] of VLIW INST. #8, which is stored in SIFAR 76, is returned to IFAR 33, multiplexer 16 selects K*2+δ representing the number of remaining unexecuted instructions stored in SRICR 93.

The reason of why a cycle for the inhibited WB stage of the instruction 8 [K*(m–2)+1] does not become a reexecution IF stage is that one cycle is necessary for preparing a reexecution process such as counting the number of operable execution units by count means 13. Count means 13, shown in FIG. 3, receives from execution unit 2a, which is a faulty execution unit, a failure signal thereby providing a counting operation result of K–1 since it receives no failure signals from the other normal operable execution units.

Pipeline stages which are reexecuted start with the following stages.

IF STAGE OF INST. 8 [K*(m–2)+1] OF VLIW INST. #8
IF STAGE OF INST. 8 [K*(m–2)+2] OF VLIW INST. #8
IF STAGE OF INST. 8 [K*(m–1)–1] OF VLIW INST. #8
IF STAGE OF INST. 8 [K*(m—1)] OF VLIW INST. #8

While the instructions of the foregoing (m–1)th instruction set are being outputted from instruction cache 5, subtracter 16 performs an operation of subtracting a count result outputted from count means 13 from the number of saving remaining instructions, i.e., (K*2+δ)–(K–1), to provide R (=K+δ+1) representing the number of remaining unexecuted instructions. Since R>N (=K–1), RCM 18 controls multiplexer 17 to select N (=K–1) representing the number of normally operable execution units outputted from count means 13. Multiplier 19 performs an operation of multiplying an instruction length and the number of instructions which are executed (i.e., N=the number of normally operable execution units) together. Adder 34 prepares an address for INST. 8 [K*(m−1)] as a lading part of a subsequent instruction fetch address. This address is taken into IFAR 33 at the beginning of a subsequent cycle. At this point in time, K+δ+1 representing the number of remaining instructions is taken into RICR 14.

INST. 8[K*(m−1)] is read out of instruction cache 5 simultaneously with an instruction located in front of INST. 8[K*(m−1)] (i.e., INST. 8 [K*(m−2)+1]) and is stored in the kth RIR register 20k. However, in the IA stage in a subsequent cycle, multiplexer 45 of IAM 24 (see FIG. 5) selects a NOP INSTRUCTION and the selected NOP instruction is stored in AIR 25a (the first AIR). The k instructions previously read are selected by multiplexers 46–51 in a form such that each of the k instructions is shifted one place to the right, and are stored in the second to kth RIRs 25b–25k. INST. 8 [K*(m−1)], which is the last instruction, is shifted out to disappear. This last instruction is re-read from instruction cache 5 to serve as a leading instruction in the next cycle's IF stage and is stored in RIR 20a (the leading RIR).

Figure 12:
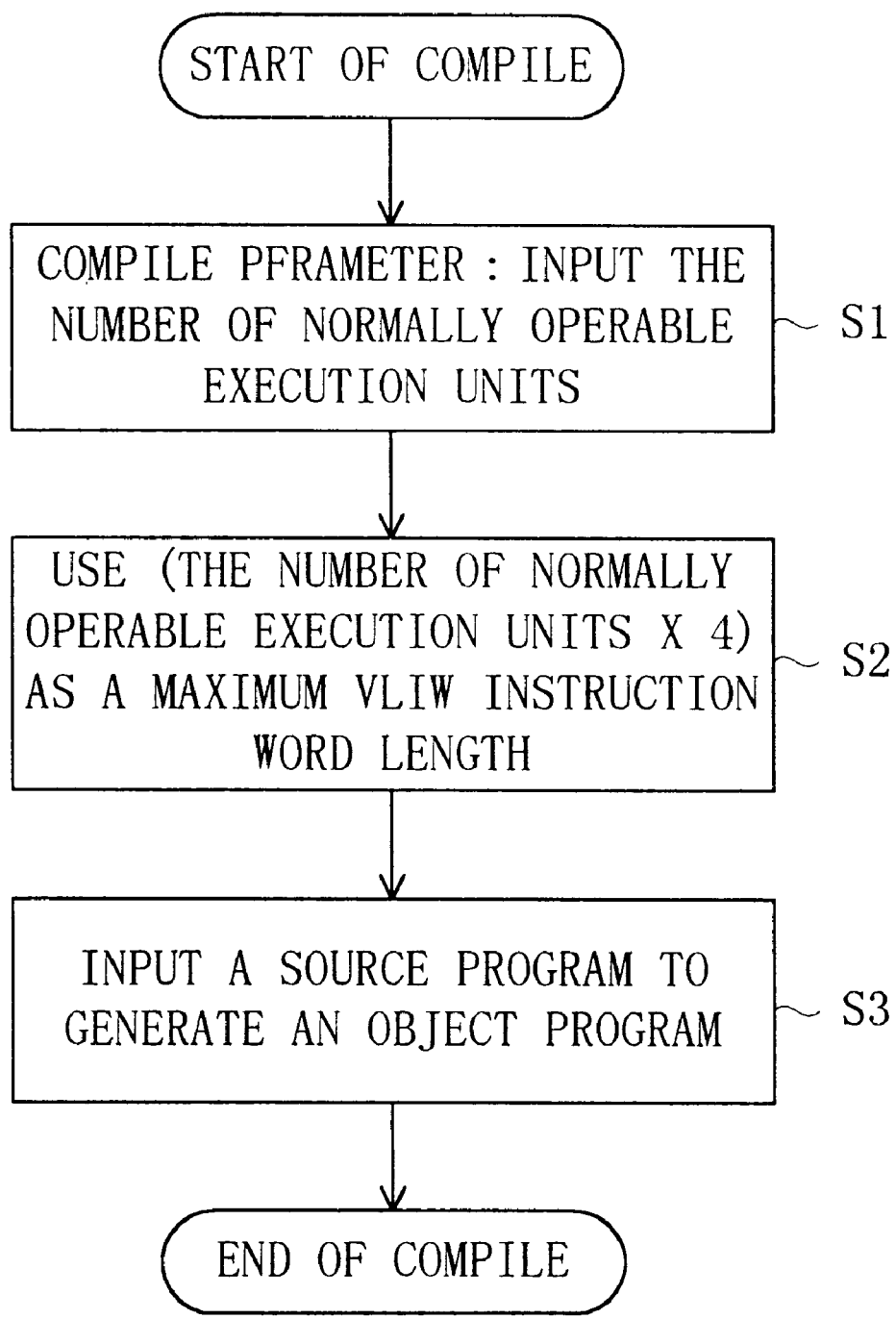
FIG. 12 shows a compile procedure in a compiler.

At the same cycle that the second IF stage of INST. 8 [K*(m−1)] is performed, subtracter 15 performs an operation of subtracting (K−1) representing the number of normally operable execution units from (K+δ+1) representing the number of remaining unexecuted instructions stored in RICR 14 selected by multiplexer 16, to provide R=δ+2. Referring now to FIG. 12, the case that δ+2≦K=1 holds is shown. However, when δ+2>K−1 (in the case of δ=K−1 or δ=K−2, since 0<δ<K), the last instruction set of VLIW INST. #8 enters pipelining with a delay of one cycle with respect to INST. 8 [K*m−1]. Thereafter, VLIW INST. #9 and VLIW INST. #10 are subjected to pipeline processing in that order.

Although the VLIW instruction processor of the present embodiment has the ability to execute VLIW INSTRUCTIONS having any instruction word length, its best performance may be obtained in executing a VLIW INSTRUCTION having an instruction word length corresponding to the number of instructions equal to the number of operable execution units.

When an initial failure or a POT failure is detected by post-LSI fabrication examination in an execution unit, a process of adding wiring at additional wiring formation section 92 by FIB equipment is performed and the number of execution units which can normally operate is applied, as a parameter, to a compiler of the VLIW instruction processor for compiling.

The operation of the compiler is shown in FIG. 12. In step S1, the compiler receives, from count means 13 of FIG. 3, N representing the number of normally operable execution units, taking the number of instructions to be executed at the same time as a compile parameter. In step S2, a number, which is an integral multiple of N (four in the figure), is used as a maximum VLIW instruction word length. In step S3, a source program is read in to generate an object program.

A VLIW instruction processor having 20 execution units (k =20) is explained. When compiling is performed by use of k=20 and when an initial failure is discovered in one execution unit by post-LSI fabrication examination, the execution of a VLIW INSTRUCTION composed of 20 instructions is divided into two. In the first execution, the number of instructions to be executed is 19. In the second execution, the number of instructions to be executed is 1. On the average, the number of execution instructions per cycle is 10. If the aforesaid method is employed, however, compiling is performed at the number of execution units (i.e., 19) correspondingly to the failure. Accordingly, the average number of execution instructions per cycle is 19, which makes full use of the size of hardware. Higher performance is ensured.

For redundancy purpose, DRAMs have spare execution units and parallel computers have spare element processors. When a failure occurs, such a spare element is useful. However, when no failure occurs, no spare elements are used and become a waste. Conversely, in the foregoing method, when there are detected no failures, all execution units placed in a processor normally operate. On the other hand, when a failure occurs in an execution unit, operations are performed in a reduced manner thereby producing no wastes.

Figure 15:
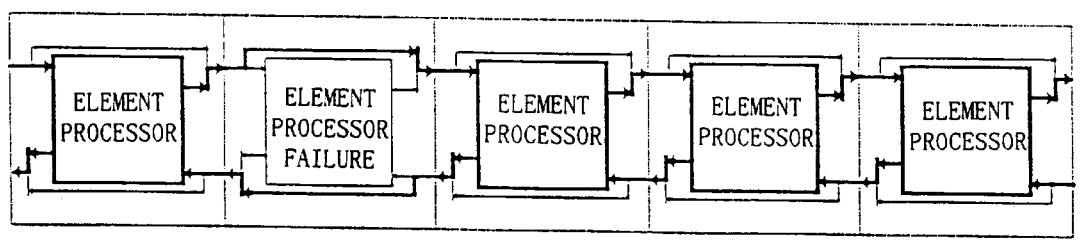
FIG. 15 depicts signal routing when, in a parallel computer whose array part is formed by one-dimensional lattice bonding of element processors, one of the element processors fails to function normally.
Figure 16:
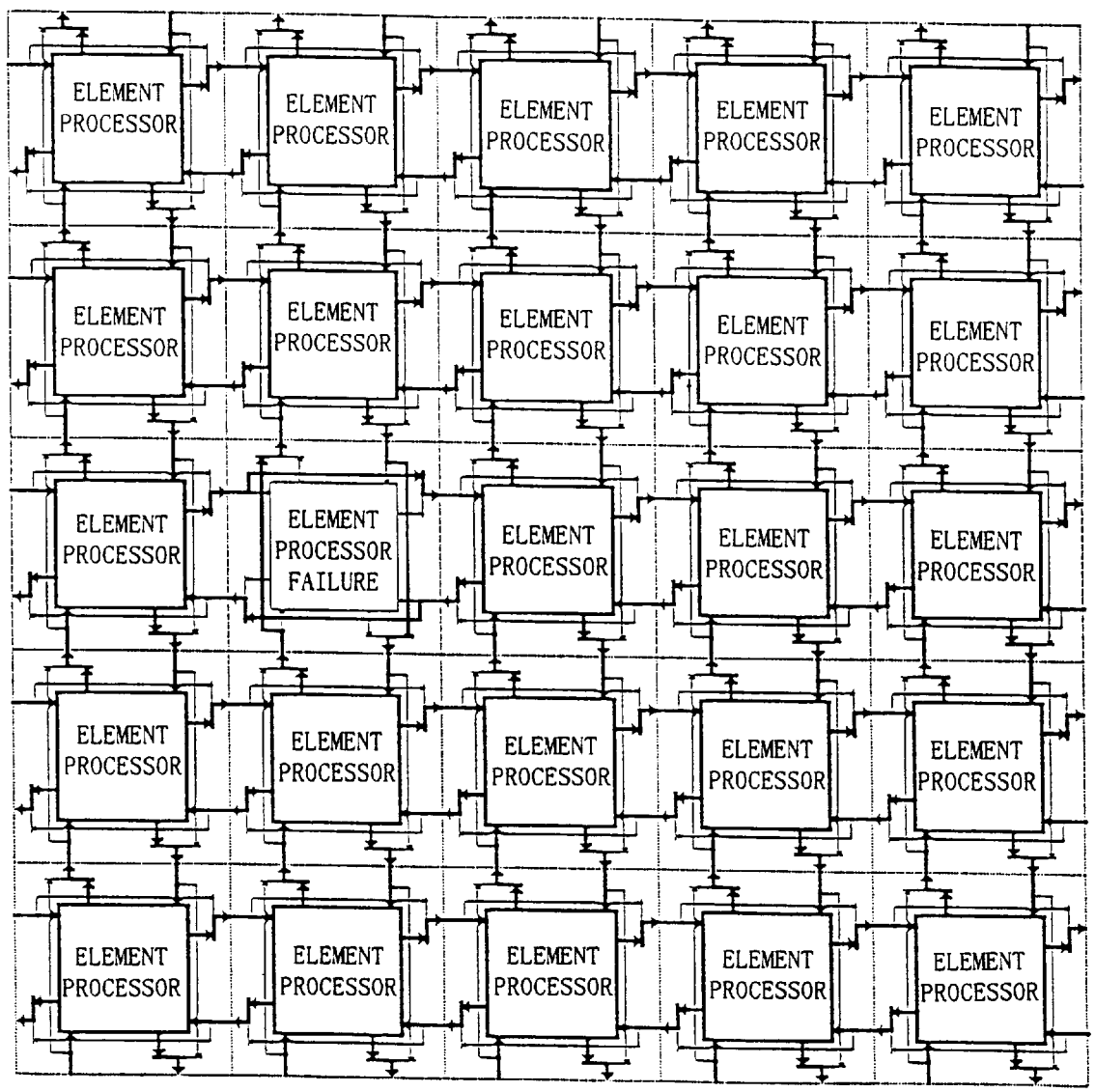
FIG. 16 shows signal routing when, in a parallel computer whose array part is formed by two-dimensional lattice bonding of element processors, one of the element processors fails to function normally.

The description has been made in terms of a variable word length VLIW instruction processor. However, the present invention finds applications in fixed word length VLIW instruction processors. Additionally, the type of instruction that is processed in the processor is not limited to VLIW INSTRUCTION. The present invention further finds applications in parallel computers (processors) capable of performing parallel arithmetic operations such as SIMD processors and MIMD processors. An example of applying the present invention in a parallel computer, is illustrated. FIG. 15 shows a parallel computer. This parallel computer comprises a plurality of element processors arranged one-dimensionally. An array part is formed by one-dimensional lattice bonding of these element processors. FIG. 16 shows a parallel computer. This parallel computer comprises a plurality of element processors arranged two-dimensionally. An array part is formed by two-dimensional lattice bonding of these element processors. In both of the parallel computers, each element processor contains therein an execution unit of FIG. 2 having FSOM 100 comprising IFSOM 101 and OFDM 102.

Figure 13:
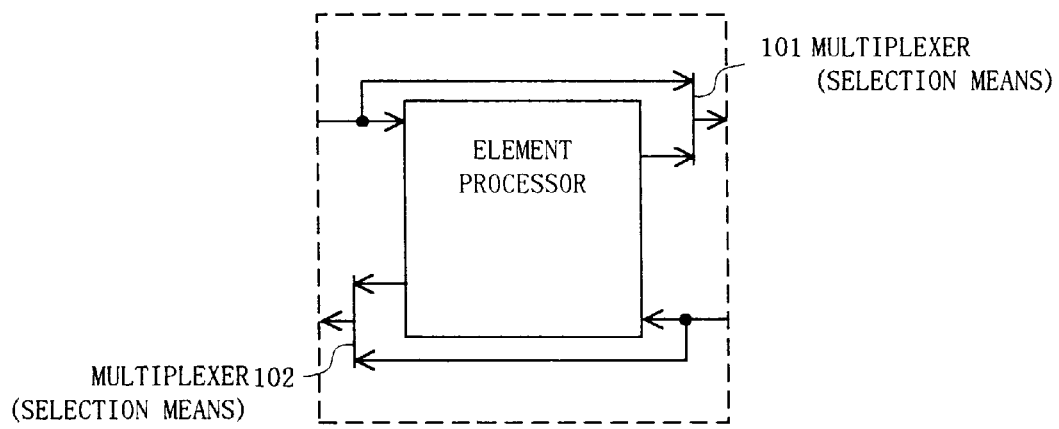
FIG. 13 shows, in a parallel computer whose array part is formed by one-dimensional lattice bonding of element processors, an arrangement around one of the element processors.

As shown in FIG. 13, when an array part is formed by one-dimensional lattice bonding of element processors, multiplexers (selection means) 101 and 102 are provided in an element processor. Multiplexer 101 selects between an input signal from an element processor located on the left-hand side of its own element processor and an output signal from its own element processor to an element processor located on the right-hand side. Multiplexer 101 is controlled by a failure signal outputted from NOR circuit 94 of its own element processor. More specifically, if no failure occurs in its own element processor, multiplexer 101 then selects an output signal from the element processor. On the other hand, if a failure occurs, multiplexer 101 then selects an input signal from the left-hand side element processor. Likewise, multiplexer 102 (selection means) is provided which selects between an input signal from the right-hand side element processor and an output signal from its own element processor to the left-hand side element processor. Multiplexer 102 is controlled by failure signals from NOR circuit 94 of its own element processor.

Figure 14:
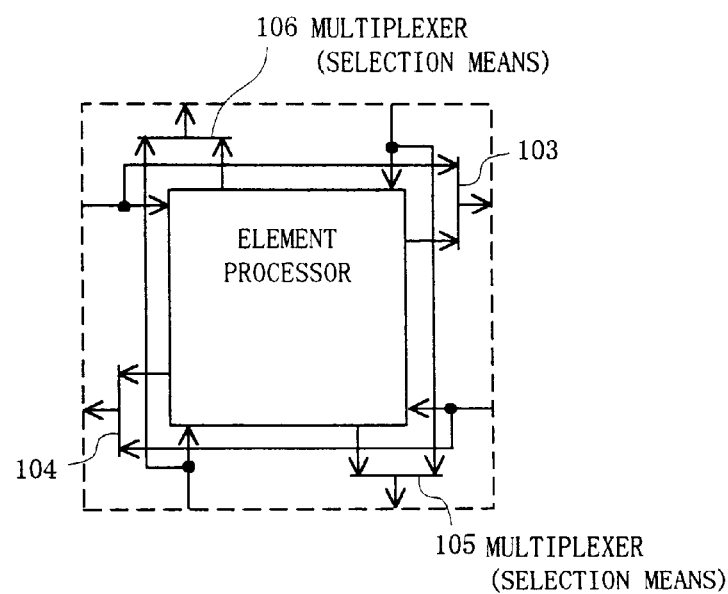
FIG. 14 shows, in a parallel computer whose array part is formed by two-dimensional lattice bonding of element processors, an arrangement around one of the element processors.

As shown in FIG. 14, when an array part is formed by two-dimensional lattice bonding of element processors, multiplexers 103 and 104, which are the same as multiplexers 101 and 102 of FIG. 13, are provided. Multiplexers 105 and 106 are provided for vertical signal communication. These multiplexers are controlled by a failure signal from NOR circuit 94 of its own element processor.

In a parallel computer having an array part formed by one-dimensional lattice bonding of element processors, a route for communication, when there is a failure in an element processor (the second one from the left in FIG. 15), is shown by bold lines. Such a faulty element processor can be separated from the others.

In a parallel computer having an array part formed by two-dimensional lattice bonding of element processors, a route for communication, when there is a failure in an element processor (third row, second column as shown in FIG. 16), is shown by bold lines. Such a faulty element processor can be separated from the others.

A faulty element processor location is fed to a compiler as a compile parameter for compile processing, which makes it possible to avoid discarding an entire chip even if a part of its element processors fail to operate normally, as in the previously described VLIW instruction processor.

The invention claimed is:

1. A processor having a plurality of execution units for executing respective instructions, each of said execution units comprising:

initial failure signal output means for providing an initial failure signal when an initial failure is detected by post-fabrication failure detection testing in said execution unit.

2. A processor according to claim 1, wherein each of said initial failure signal output means includes a first wiring through which said initial failure signal is provided, said first wiring having an empty section that is formed by removing a part of said first wiring for additional wiring formation; and, when an initial failure is detected by post-fabrication failure detection testing, an additional wiring is added to said empty section.

3. A processor according to claim 2, wherein each of said initial failure signal output means further includes a second wiring through which a signal indicative of an absence of an initial failure is provided, and, when an initial failure is detected by post-fabrication failure detection testing, a portion of said second wiring is removed.

4. A processor according to claim 1, wherein said execution units are integrated into a single chip.

5. A processor according to claim 1 further comprising:

instruction allocation means which, in response to initial failure signals from said initial failure signal output means, allocates instructions to normally operable execution units of said plurality of execution units other than ones which fail to operate normally.

6. A processor having a plurality of execution units for executing respective instructions, each of said execution units comprising:

operating failure detection means for checking said execution unit for a passage-of-time failure by characteristic degradation with use, and for providing an operating failure detection signal when such a failure is detected.

7. A processor according to claim 6, wherein said operating failure detection means includes parity check means.

8. A processor according to claim 6, wherein each of said execution units further comprises initial failure signal output means for providing an initial failure signal when an initial failure is detected by post-fabrication failure detection testing in said execution unit.

9. A processor according to claim 6 further comprising:

instruction allocation means which, in response to operating failure signals from said operating failure detection means, allocates instructions to normally operable execution units of said plurality of execution units other than ones which fail to operate normally due to the presence of passage-of-time failures.

10. A processor according to either of claims 5 or 9 further comprising:

(a) instruction count means for counting a number of instructions to be executed simultaneously; and
    (b) instruction repetition execution means for, when a result of said counting performed by said instruction count means is in excess of a number of normally operable execution units, dividing execution of said instructions to be executed simultaneously so that said instructions are executed at a plurality of times by said normally operable execution units.

11. A processor according to claim 10, said instruction repetition execution means including:

(a) count means which receives failure signals indicative of the presence of failures from faulty execution units of said plurality of execution units and which counts, based on said failure signals, the number of normally operable execution units, N;
    (b) subtraction means which first performs an operation of subtracting N from L to find R, where L is a number of initially remaining instructions contained in a VLIW instruction and R is a number of remaining unexecuted instructions contained in said VLIW instruction, and then repeatedly performs said operation of subtracting N from R; and
    (c) repetition control means for:
        repeatedly allocating N instructions to said N normally operable execution units when R is greater than or equal to N;
        allocating R instructions to R execution units of said N normally operable execution units when R is less than N and greater than zero; and
        allocating L instructions to L execution units of said N normally operable execution units when L is less than or equal to N.

12. A processor according to either of claims 5 or 9, wherein said instruction allocation means allocates a number of instructions to be executed simultaneously, equal to the number of normally operable execution units, to said normally operable execution units; and allocates no-operation instructions to any faulty execution units.

13. A processor according to claim 12 wherein said instruction allocation means includes a plurality of different stage shift means arranged at first to kth stages, respectively, each shift means corresponding to a different one of said execution units; and wherein each of said shift means selects between allocating a no-operation instruction to its corresponding execution unit and allocating an executable instruction to its corresponding execution unit.

14. A processor according to claim 13, wherein:

(a) said first stage shift means which corresponds to a first of said execution units receives said plurality of instructions to be executed simultaneously, and a failure signal indicative of a failure in said first execution unit when such failure is present;
    (b) when said failure signal indicates that said failure is present in the first execution unit, said first stage shift means allocates a no-operation instruction to said first execution unit and provides said received instructions to a second stage shift means; and
    (c) when said failure signal indicates that no failure is present in the first execution unit, said first stage shift means allocates an executable instruction in a leading position of said received instructions to said first execution unit and provides remaining instructions other than said leading instruction to said second stage shift means.

15. A processor according to claim 14 wherein:
(a) each of said second to kth stage shift means receives a failure signal indicative of a failure in its corresponding execution unit when such a failure is present;
(b) when one of the failure signals indicates that a failure is present in the corresponding execution unit, the corresponding shift means allocates a no-operation signal to said corresponding execution unit and provides said received instructions to a subsequent stage shift means; and
(c) when one of the failure signals indicates that no failure is present in the corresponding execution unit, the corresponding shift means allocates an executable instruction in the leading position of said received instructions to said corresponding execution unit and provides remaining instructions other than said leading instruction to said subsequent stage shift means.

16. A processor according to claim 13, wherein:
said first stage shift means is provided with a number of selectors equaling the number of instructions to be executed simultaneously;
said kth stage shift means is provided with a single selector; and
each of the remaining shift means is provided with a number of selectors equaling one less than the number of selectors in a preceding stage shift means.

17. A processor according to claim 16, wherein:
(a) each of said selectors receives an executable instruction and a no-operation instruction, and a failure signal indicative of a failure in a corresponding execution unit when such a failure is present;
(b) when said failure signal indicates that said failure is present in the corresponding execution unit, said selector selects said no-operation instruction; and
(c) when said failure signal indicates that no failure is present in the corresponding execution unit, said selector selects said executable instruction.

18. A processor according to either of claims 5 or 9 wherein said instruction allocation means allocates instructions contained in a very long instruction word (VLIW) instruction to normally operable execution units of said plurality of execution units.

19. A processor according to claim 18 wherein said VLIW instruction is a variable word length VLIW instruction containing therein instructions the number of which is variable.

20. A processor according to claim 19, further comprising a VLIW instruction word length register; wherein
said VLIW instruction contains a rewrite command for rewriting an instruction word length to a set value and storing said instruction word length in said VLIW instruction word length register; and
an instruction word length for a subsequent VLIW instruction is rewritten according to said instruction word length stored in said VLIW instruction word length register.

21. A processor according to claim 20 further comprising instruction count calculation means for computing, based on said instruction word length stored in said VLIW instruction word length register, the number of instructions contained in a single VLIW instruction.

22. A processor according to either of claims 1 or 6 further comprising:
count means for counting a number of normally operable execution units in response to failure signals from said failure signal output means; and
a compiler which generates an object program and receives a result of said counting performed by said count means, using a number of instructions to be executed simultaneously as a compile parameter.

23. A processor according to claim 22 wherein said compiler employs, as an instruction length for a VLIW instruction that is executed, a number that is an integral multiple of said number of normally operable execution units.

24. A processor having a plurality of element processors for executing respective parallel arithmetic operations, each of said element processors comprising:
initial failure signal output means for providing an initial failure signal when an initial failure is detected by post-fabrication failure detection testing in said element processor.

25. A processor having a plurality of element processors for executing respective parallel arithmetic operations, each of said element processors comprising:
operating failure detection means for checking each of said element processors for the presence or absence of a passage-of-time failure by characteristic degradation with use, and for providing an operating failure detection signal when such a failure is detected.

26. A processor according to either of claims 24 or 25 further comprising:
selection means for selecting, in response to failure signals from said failure signal output means, a communication route between said element processors to allow a one of said element processors that receives data from a faulty element processor to receive data from another of said element processors that outputs data to said faulty element processor.

27. A processor according to either of claims 24 or 25 wherein one-dimensional lattice bonding of said element processors forms an array part.

28. A processor according to either of claims 24 or 25 wherein two-dimensional lattice bonding of said element processors forms an array part.

29. A processor comprising:
a plurality of execution units for executing respective instructions, with each of said execution units comprising a failure signal output means for providing a failure signal when a failure occurs in said execution unit;
instruction allocation means for allocating, in response to the failure signals from the failure signal output means, instructions to normally operable execution units;
instruction count means for counting a number of instructions to be executed simultaneously; and
instruction repetition execution means for, when a result of said counting performed by said instruction count means is in excess of a number of normally operable execution units, dividing execution of said instructions to be executed simultaneously so that said instructions are executed at a plurality of times by said normally operable execution units.

30. A processor according to claim 29, said instruction repetition execution means comprising:
(a) count means which receives failure signals indicative of the presence of failures from faulty execution units of said plurality of execution units and which counts, based on said failure signals, the number of normally operable execution units, N;
(b) subtraction means which first performs an operation of subtracting N from L to find R, where L is a number of initially remaining instructions contained in a VLIW instruction and R is a number of remaining unexecuted instructions contained in said VLIW instruction, and then repeatedly performs said operation of subtracting N from R; and (c) repetition control means for:
   repeatedly allocating N instructions to said N normally operable execution units when R is greater than or equal to N;
   allocating R instructions to R execution units of said N normally operable execution units when R is less than N and greater than zero; and
   allocating L instructions to L execution units of said N normally operable execution units when L is less than or equal to N.

31. A processor comprising:
a plurality of execution units for executing respective instructions, with each of said execution units comprising a failure signal output means for providing a failure signal when a failure occurs in said execution unit;
instruction allocation means for allocating, in response to the failure signals from the failure signal output means, instructions to normally operable execution units; and
wherein said instruction allocation means allocates a number of instructions to be executed simultaneously to the normally operable execution units, said number of instructions to be executed simultaneously being equal to the number of normally operable execution units, and allocates no-operation instructions to any faulty execution units.

32. A processor according to claim 31 wherein said instruction allocation means includes a plurality of different stage shift means arranged at first to kth stages, respectively, each shift means corresponding to a different one of said execution units; and wherein each of said shift means selects between allocating a no-operation instruction to its corresponding execution unit and allocating an executable instruction to its corresponding execution unit.

33. A processor according to claim 32, wherein:
(a) said first stage shift means which corresponds to a first of said execution units receives said plurality of instructions to be executed simultaneously, and a failure signal indicative of a failure in said first execution unit when such failure is present;
(b) when said failure signal indicates that said failure is present in the first execution unit, said first stage shift means allocates a no-operation instruction to said first execution unit and provides said received instructions to a second stage shift means; and
(c) when said failure signal indicates that no failure is present in the first execution unit, said first stage shift means allocates an executable instruction in a leading position of said received instructions to said first execution unit and provides remaining instructions other than said leading instruction to said second stage shift means.

34. A processor according to claim 33 wherein:
(a) each of said second to kth stage shift means receives a failure signal indicative of a failure in its corresponding execution unit when such a failure is present;
(b) when one of the failure signals indicates that a failure is present in the corresponding execution unit, the corresponding shift means allocates a no-operation signal to said corresponding execution unit and provides said received instructions to a subsequent stage shift means; and
(c) when one of the failure signals indicates that no failure is present in the corresponding execution unit, the corresponding shift means allocates an executable instruction in the leading position of said received instructions to said corresponding execution unit and provides remaining instructions other than said leading instruction to said subsequent stage shift means.

35. A processor according to claim 32, wherein:
said first stage shift means is provided with a number of selectors equaling the number of instructions to be executed simultaneously;
said kth stage shift means is provided with a single selector; and
each of the remaining shift means is provided with a number of selectors equaling one less than the number of selectors in a preceding stage shift means.

36. A processor according to claim 35, wherein:
(a) each of said selectors receives an executable instruction and a no-operation instruction, and a failure signal indicative of a failure in a corresponding execution unit when such a failure is present;
(b) when said failure signal indicates that said failure is present in the corresponding execution unit, said selector selects said no-operation instruction; and
(c) when said failure signal indicates that no failure is present in the corresponding execution unit, said selector selects said executable instruction.

37. A processor comprising:
a plurality of execution units for executing respective instructions, with each of said execution units comprising a failure signal output means for providing a failure signal when a failure occurs in said execution unit;
instruction allocation means for allocating, in response to the failure signals from the failure signal output means, instructions to normally operable execution units, wherein said instruction allocation means allocates instructions contained in a very long instruction word (VLIW) instruction to normally operable execution units of said plurality of execution units.

38. A processor according to claim 37 wherein said LVIW instruction is a variable word length VLIW instruction containing a variable number of instructions.

39. A processor according to claim 38, further comprising a VLIW instruction word length register; wherein
said VLIW instruction contains a rewrite command for rewriting an instruction word length to a set value and storing said instruction word length in said VLIW instruction word length register; and
an instruction word length for a subsequent VLIW instruction is rewritten according to said instruction word length stored in said VLIW instruction word length register.

40. A processor according to claim 39 further comprising instruction count calculation means for computing, based on said instruction word length stored in said VLIW instruction word length register, the number of instructions contained in a single VLIW instruction.

41. A processor comprising:
a plurality of execution units for executing respective instructions, with each of said execution units comprising a failure signal output means for providing a failure signal when a failure occurs in said execution unit;
count means for counting a number of normally operable execution units in response to failure signals from said failure signal output means; and a compiler that generates an object program and receives a result of said counting performed by said count means, using a number of instructions to be executed simultaneously as a compile parameter.

42. A processor according to claim 41 wherein said compiler employs, as an instruction length for a VLIW instruction that is executed, a number that is an integer multiple of said number of normally operable execution units.

* * * * *